(12) United States Patent
Ivans

(10) Patent No.: US 7,617,992 B2
(45) Date of Patent: Nov. 17, 2009

(54) SYSTEM AND METHOD FOR MAINTAINING IRRIGATION ACCURACY OF AN IRRIGATION SYSTEM

(76) Inventor: Norman Ivans, 1496 Vista Claridad, La Jolla, CA (US) 92037

( * ) Notice: Subject to any disclaimer, the term of this patent is extended or adjusted under 35 U.S.C. 154(b) by 646 days.

(21) Appl. No.: 10/977,916

(22) Filed: Oct. 30, 2004

(65) Prior Publication Data

US 2006/0102734 A1    May 18, 2006

(51) Int. Cl.
*B05B 17/04* (2006.01)
(52) U.S. Cl. .............................. 239/11; 239/68; 239/71; 239/73; 239/207; 239/225.1; 239/242; 239/243; 239/255
(58) Field of Classification Search .................. 239/63, 239/69, 71, 73, 243, 245, 255, 210; 132/553, 132/556; 700/284
See application file for complete search history.

(56) References Cited

U.S. PATENT DOCUMENTS

| | | | |
|---|---|---|---|
| 1,970,126 A | 8/1934 | Buckner | |
| 2,253,979 A | 8/1941 | De Lacy-Wulhall | |
| 2,524,796 A | 10/1950 | Higgins | |
| 2,577,337 A | 12/1951 | Lancaster | |
| 2,979,271 A | 4/1961 | Boyden | |
| 3,091,399 A | 5/1963 | Kennedy | |
| 3,144,046 A | 8/1964 | Seesselberg | |
| RE25,942 E | 12/1965 | Reynolds | |
| 3,552,655 A | 1/1971 | Feeney | |
| 3,626,286 A | 12/1971 | Rauchwerger | |
| 3,642,204 A | 2/1972 | McCloskey | |
| 3,750,001 A | 7/1973 | McCloskey | |
| 3,782,637 A | 1/1974 | Crumpacker | |
| 3,802,627 A * | 4/1974 | Seckler et al. .............. | 239/729 |
| 3,803,570 A | 4/1974 | Barlow et al. | |
| 3,902,668 A * | 9/1975 | Daugherty et al. .......... | 239/729 |
| 3,905,153 A | 9/1975 | Enter | |
| 4,004,612 A | 1/1977 | Hummel, Jr. et al. | |
| 4,072,269 A | 2/1978 | Berg | |
| 4,119,275 A | 10/1978 | Hunter | |
| 4,161,292 A * | 7/1979 | Holloway et al. ............. | 239/11 |
| 4,190,068 A | 2/1980 | Beusch et al. | |
| 4,274,583 A | 6/1981 | Hunter | |
| 4,309,874 A | 1/1982 | Jacobi, Jr. et al. | |
| RE31,023 E | 9/1982 | Hall, III | |

(Continued)

FOREIGN PATENT DOCUMENTS

WO    WO 01/37641 A1    5/2001

*Primary Examiner*—Dinh Q Nguyen
(74) *Attorney, Agent, or Firm*—Roeder & Broder LLP; James P. Broder

(57) ABSTRACT

An irrigation system (10) includes one or more alignment guides (38) and an irrigation unit (20). The irrigation unit (20) directs irrigation fluid (19) to at least a portion of an irrigation region (30). The irrigation unit (20) includes a nozzle (220), a sensor (260) that senses a change in position of a portion of the irrigation unit (20) relative to the alignment guides (38), and a unit control system (240). The sensor (260) can be an infrared sensor. The unit control system (240) receives information from the sensor (260) regarding the change in position and adjusts a flow rate of irrigation fluid (19) through the nozzle (220) and/or a position of the nozzle (220) relative to the alignment guides (38). The alignment guides (38) can be formed from a heat absorbing material that is sensed by the sensor (260).

56 Claims, 15 Drawing Sheets

U.S. PATENT DOCUMENTS

| | | |
|---|---|---|
| 4,396,149 A | 8/1983 | Hirsch |
| 4,522,338 A | 6/1985 | Williams |
| 4,567,563 A * | 1/1986 | Hirsch ................. 700/284 |
| 4,592,505 A | 6/1986 | Bruninga et al. |
| 4,646,224 A | 2/1987 | Ransburg et al. |
| 4,754,925 A | 7/1988 | Rubinstein |
| 4,795,099 A | 1/1989 | Wolfbauer et al. |
| 4,838,310 A | 6/1989 | Scott et al. |
| 4,852,802 A | 8/1989 | Iggulden et al. |
| 4,913,351 A | 4/1990 | Costa |
| 4,914,339 A | 4/1990 | Hayman, Jr. et al. |
| 4,998,826 A | 3/1991 | Wood et al. |
| 5,009,368 A | 4/1991 | Streck et al. |
| 5,021,939 A | 6/1991 | Pulgiese |
| 5,097,861 A | 3/1992 | Hopkins et al. |
| 5,148,985 A | 9/1992 | Bancroft |
| 5,173,855 A | 12/1992 | Nielsen et al. |
| 5,222,669 A | 6/1993 | Lawson |
| 5,229,937 A | 7/1993 | Evelyn-Veere |
| 5,248,093 A * | 9/1993 | Pleasants ................. 239/239 |
| 5,251,653 A | 10/1993 | Tucker et al. |
| 5,333,785 A | 8/1994 | Dodds et al. |
| 5,337,957 A | 8/1994 | Olson |
| 5,341,995 A * | 8/1994 | Leatch ................. 239/729 |
| 5,539,637 A | 7/1996 | Upchurch et al. |
| 5,542,987 A | 8/1996 | Gatt et al. |
| 5,675,938 A | 10/1997 | McLorg |
| 5,740,031 A | 4/1998 | Gagnon |
| 5,740,038 A | 4/1998 | Hegert |
| 5,839,660 A | 11/1998 | Morgenstern et al. |
| 5,847,568 A | 12/1998 | Stashkiw et al. |
| 5,927,603 A | 7/1999 | McNabb |
| 5,931,882 A | 8/1999 | Fick et al. |
| 6,057,770 A | 5/2000 | Justesen |
| 6,088,621 A | 7/2000 | Woytowitz et al. |
| 6,108,590 A | 8/2000 | Hergert |
| 6,145,755 A | 11/2000 | Feltz |
| 6,209,576 B1 | 4/2001 | Davis |
| 6,286,765 B1 | 9/2001 | Byles |
| 6,312,191 B1 | 11/2001 | Rosenfeld |
| 6,314,340 B1 | 11/2001 | Mecham et al. |
| 6,337,635 B1 | 1/2002 | Erickson et al. |
| 6,402,048 B1 * | 6/2002 | Collins ................. 239/63 |
| 6,431,475 B1 | 8/2002 | Williams |
| 6,452,499 B1 | 9/2002 | Runge et al. |
| 6,470,683 B1 | 10/2002 | Childs et al. |
| 6,490,505 B1 | 12/2002 | Simon et al. |
| 6,507,775 B1 | 1/2003 | Simon et al. |
| 6,529,615 B2 | 3/2003 | Hendrickson et al. |
| 6,568,416 B2 | 5/2003 | Tucker et al. |
| 6,766,221 B1 * | 7/2004 | Christiansen ................. 700/284 |
| 6,782,310 B2 | 8/2004 | Bailey et al. |
| 2002/0002425 A1 | 1/2002 | Dossey et al. |
| 2002/0125338 A1 | 9/2002 | Collins |
| 2002/0183935 A1 | 12/2002 | Skinner |

* cited by examiner

SYSTEM AND METHOD FOR MAINTAINING IRRIGATION ACCURACY OF AN IRRIGATION SYSTEM

REFERENCE TO RELATED APPLICATION

This application claims priority on copending U.S. application Ser. No. 10/762,134 filed on Jan. 20, 2004 and entitled "IRRIGATION UNIT INCLUDING A POWER GENERATOR". As far as is permitted, the contents of U.S. application Ser. No. 10/762,134 are incorporated herein by reference.

BACKGROUND

Water is becoming an increasingly valuable and scarce commodity both in the United States and abroad. In particular, extreme drought conditions are common in arid regions such as the desert southwestern United States, although a decreased level of precipitation and resulting low water supplies can occur just about anywhere at various times. To compound matters, substantial amounts of water are squandered due to inefficient and ineffective conventional irrigation systems, for a variety of reasons.

For example, typical irrigation units distribute water in a full round, half-round, quarter-round or an adjustable-type circular pattern. Thus, no matter how the irrigation units are arranged, obtaining consistent water coverage over a rectangular watering area is difficult or impossible. Watering normally occurs to prevent brown spots, resulting in over watering in basically all other areas. In fact, in order to ensure that all areas are adequately irrigated, overlapping spray regions occur, which can result in certain areas receiving 300% or more of the necessary amount of water.

Further, runoff from elevated areas such as mounds, slopes or hills causes ponding in lower areas, which can ultimately result in the higher areas absorbing an insufficient amount of water, while the lower areas are being saturated with water. Thus, watering occurs indiscriminately whether certain areas of the ground are wet or dry. In addition, in hot, windy conditions, water has a higher evaporation rate and may not actually reach the ground in the intended location, if at all. Moreover, different types of grass, trees or other foliage require varying levels of irrigation. These problems are exacerbated when the watering area is irregularly-shaped and includes areas that do not require water, such as walkways, driveways, fountains, ponds or other surfaces or features.

Consequently, a significant quantity of water is routinely wasted, resulting in higher water bills and lower reservoirs. Further, the cost for pumping large amounts of water can result in increasingly high electrical expenses. In large turf areas, such as on golf courses, excessive and inefficient watering can give rise to enormous costs to the owner, thereby making maintaining a lush, green golf course prohibitive.

Further, turf and soil maintenance is significantly increased due to the deposits of minerals, chemicals and salts that are left in the soil from irrigation. This is particularly a problem where reclaimed water having a high total dissolved solids (TDS) content is used for irrigation. These minerals, chemicals and salts can reduce absorption of the water into the soil, can change the pH of the soil, and/or can make the soil excessively salty, inhibiting growth of vegetation in the soil.

SUMMARY

The present invention is directed to an irrigation system that applies an irrigation fluid from a fluid source to an irrigation region. The irrigation system includes a first alignment guide and an irrigation unit. The irrigation unit directs the irrigation fluid to at least a portion of the irrigation region. In one embodiment, the irrigation unit includes a nozzle that is in fluid communication with the fluid source, a sensor that senses a change in position of the first alignment guide relative to a portion of the irrigation unit, and a unit control system. The unit control system receives information from the sensor regarding the change in position of the first alignment guide. For example, the change in position can be caused by displacement of the irrigation unit or wear and tear of portions of the irrigation unit.

With this information, the unit control system can calculate the necessity of an adjustment to a flow rate of irrigation fluid through the nozzle and/or a position of the nozzle relative to the first alignment guide. The unit control system can then cause an increase or decrease in the flow rate, and/or can cause one or more actuators to move the nozzle accordingly. In another embodiment, the unit control system adjusts a rotation of the nozzle about a first axis and a rotation of the nozzle about a second axis that is substantially perpendicular to the first axis based on information regarding the change in position of the first alignment guide received from the sensor.

The first alignment guide may be formed from a heat absorbing material, a visible or invisible color spot to the human eye, a pattern, or on an existing feature, such as a rock, wall, tree, curb, fence, etc., that can be detected and/or sensed by the sensor. The irrigation system can also include additional alignment guides that are used with each irrigation unit. The alignment guides can form a polygon so that the irrigation unit is positioned substantially within the interior of the polygon. Further, the alignment guides can be positioned so that they are not on the perimeter of the irrigation region serviced by a specific irrigation unit.

In another embodiment, the irrigation system includes an irrigation unit having a first orientation relative to the first alignment guide. The sensor senses the position of the first alignment guide relative to a portion of the irrigation unit. A unit control system receives information from the sensor to determine if the portion of the irrigation unit has moved from the first orientation, and adjusts the flow rate to the nozzle and/or the position of the nozzle accordingly. In one embodiment, the sensor measures light waves, such as visible light and/or non-visible light, including infrared light.

The present invention is also directed toward a method for increasing irrigation accuracy of an irrigation unit that is susceptible to unintended movement as well as normal wear and tear.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention provides an automated irrigation system (also referred to herein simply as "irrigation system") and method for selectively irrigating a specific area. The configuration and type of area with which the irrigation system provided herein can be used can vary widely. For ease of understanding, a portion of a golf course is described herein as a representative area that can be irrigated with the present invention. However, it is recognized that any area in need of irrigation, regardless of size or location, can benefit from use with the irrigation system provided herein. For example, the irrigation system 10 can be used for irrigating a lawn, a sports field, agricultural crops and other vegetation, a cemetery, a park, or any other suitable area.

A number of Figures include an orientation system that illustrates an X axis, a Y axis that is orthogonal to the X axis, and a Z axis that is orthogonal to the X and Y axes. It should be noted that these axes can also be referred to as the first, second and third axes.

Figure 1A:
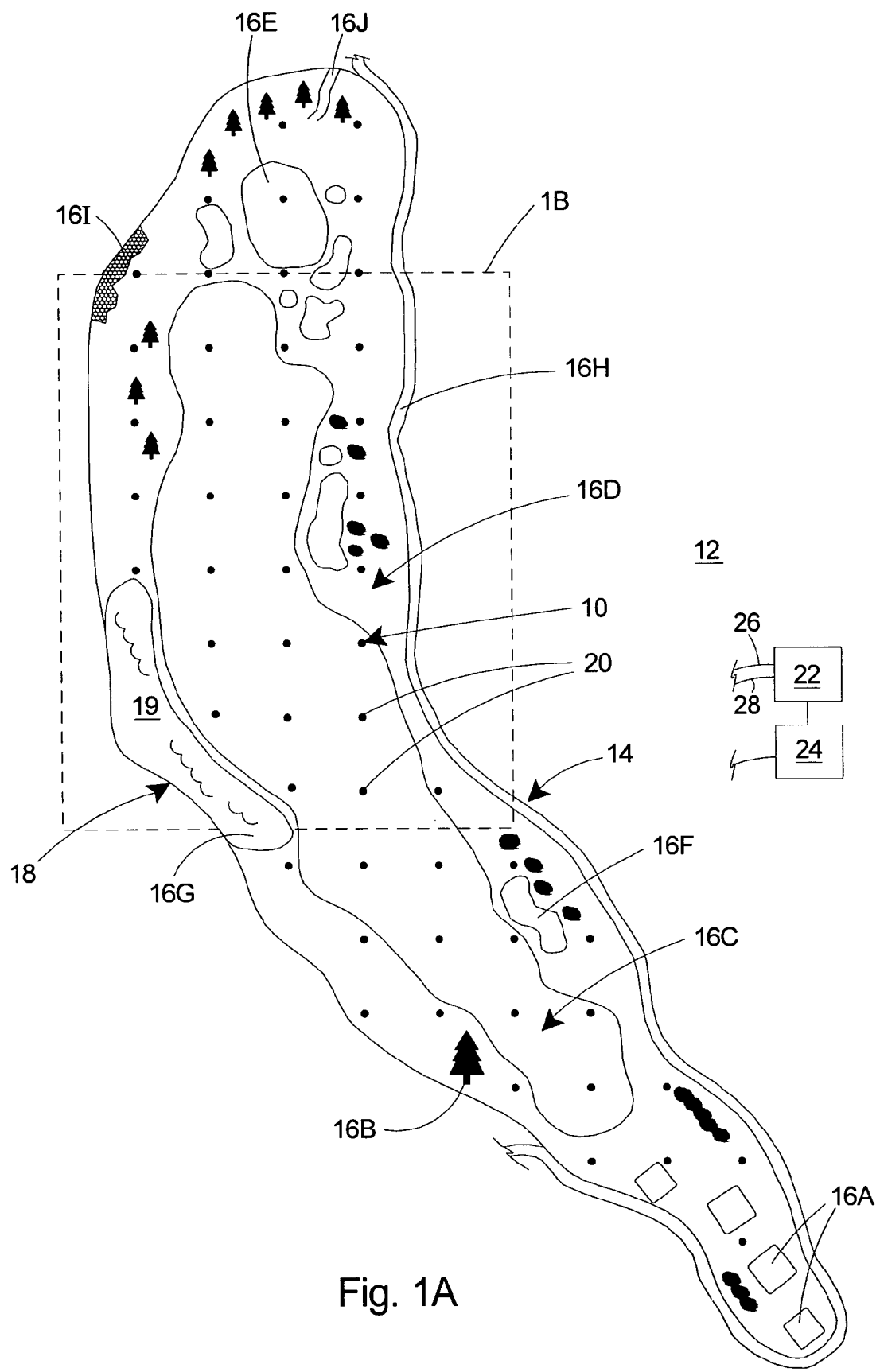
FIG. 1A is a top plan view of a hole of a golf course and an automated irrigation assembly having features of the present invention.

FIG. 1A is a top plan view of an automated irrigation system 10 having features of the present invention installed on a golf course 12 (only a portion of the golf course 12 is illustrated for clarity). More specifically, the portion of the golf course 12 illustrated in FIG. 1A includes one golf hole 14, although it is recognized that any number of golf holes 14 can be included in the golf course 12. The typical golf hole 14 can include a plurality of existing features, such as (i) one or more tee areas 16A, (ii) one or more trees, bushes or other plants (also referred to herein as "vegetation" 16B), (iii) one or more areas of relatively short turf growth (also referred to herein as a "fairway" 16C), (iv) one or more areas of longer turf growth (also referred to herein as "rough" 16D), (v) a green 16E, (vi) one or more sand traps 16F, (vii) one or more natural or manmade water features 16G such as lakes, streams, ponds, waterfalls, etc., (viii) a cart path 16H or vehicle access road, (ix) a natural or manmade rock formation 16I, and/or (x) walkways 16J, paths or bridges, as non-exclusive examples. As used herein, the "existing features" can be comprised of manmade and/or natural features.

In one embodiment, one or more of the water features 16G can serve as a fluid source 18 that uses a pump (not shown) or other suitable means to supply irrigation fluid 19 for the irrigation system 10. Alternatively, the fluid source 18 can be a water tank or other receptacle (not shown), or an offsite water source (not shown), such as a lake, river, stream or the like. Still alternatively, the fluid source 18 can include water from a municipal or reclaimed water source, as non-exclusive examples.

The type of irrigation fluid 19 utilized can vary according to the type of ground cover and the features 16A-J on the golf course 12. The irrigation fluid 19 can be (i) water, (ii) reclaimed water, (iii) waste water, (iv) water with amendments, additives, chemicals, and/or pesticides, or (v) another suitable type of fluid, as non-exclusive examples.

In one embodiment, the irrigation system 10 precisely provides irrigation fluid 19 to those features that normally would require irrigation fluid 19, such as the tee areas 16A, the vegetation 16B, the fairway 16C, and the green 16E. On the other hand, in one embodiment, the irrigation system 10 inhibits and/or minimizes the application of the irrigation fluid 19 on various other features, such as the sand traps 16F, the water features 16G, the cart paths 16H, the rock formations 16I and the walkways 16J. As provided herein, the irrigation system 10 can selectively and efficiently distribute the irrigation fluid 19 to specific areas, while reducing or eliminating the application of irrigation fluid 19 to other areas.

Additionally, the rough 16D may require irrigation fluid 19 depending upon the type of grass or other planting material included in the rough 16D and the desired condition of such grass or vegetation. For instance, if the rough 16D includes grass areas, irrigation fluid 19 may be required. However, if the rough 16D includes bark, mulch, dirt, sand or other ground cover that would not require irrigation fluid 19, the irrigation system 10 reduces or eliminates applying irrigation fluid 19 to those areas, as described in greater detail below. With this design, a decreased quantity of irrigation fluid 19 is required, thereby lowering water costs. Further, inhibiting watering of cart paths 16H and walkways 16J decreases the likelihood of (i) a golf cart losing traction, or (ii) the creation of a slip and fall hazard for a golfer, as examples.

The irrigation system 10 illustrated in FIG. 1A includes (i) a plurality of spaced apart irrigation units 20, each having a unit power source 230 (illustrated in FIG. 2D), (ii) a main control system 22, and (iii) an auxiliary power source 24. As provided in greater detail below, the irrigation units 20, the main control system 22 and the auxiliary power source 24 cooperate to distribute irrigation fluid 19 from one or more of the fluid sources 18 to specific regions of the golf course 12. In an alternative embodiment, and as explained in detail below, no auxiliary power source 24 is required. In one embodiment, the auxiliary power source 24 can be in electrical communication with the main control unit 22 and/or the irrigation units 20.

In the embodiment illustrated in FIG. 1A, the main control system 22 can be in electrical communication with one or more of the irrigation units 20 via a power line 26 and/or a data line 28. In an alternative embodiment, a single line can operate as both the power line 26 and the data line 28. Still alternatively, either or both of the power or data lines between the main control system 22 and the individual irrigation units 20 are not necessary.

The arrangement and positioning of the irrigation units 20 can vary depending upon the configuration and the water requirements of the features 16A-J on the golf course 12. Further, because the irrigation system 10 provided herein can be retrofitted for use with an existing irrigation system (not shown) as provided in greater detail below, the positioning of the irrigation units 20 described herein may also be at least partly dependent upon the location of existing irrigation units (not shown) to be retrofitted, although this is not a requirement of the present invention.

In the embodiment illustrated in FIG. 1A, the irrigation units 20 are arranged in a pattern that includes one or more rows. Alternatively, the irrigation units 20 can be arranged in a different pattern, or can be randomly placed on the golf course 12.

Figure 1B:
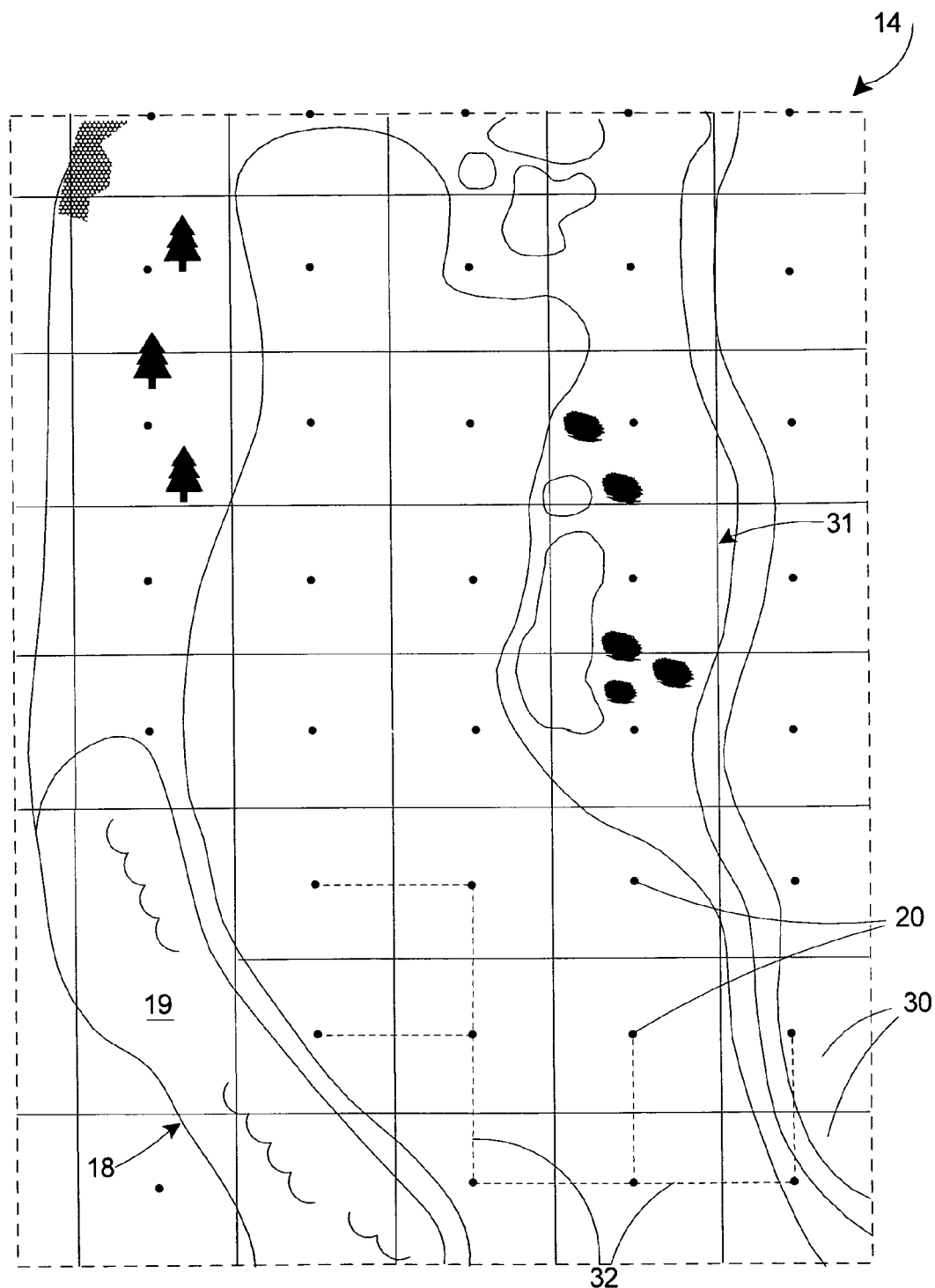
FIG. 1B is a detailed top plan view of a portion of the hole illustrated in FIG. 1A, including a first embodiment of a plurality of irrigation regions.

FIG. 1B is an enlarged view of the dashed rectangular area 1B illustrated in FIG. 1A. In the embodiment illustrated in FIG. 1B, the golf hole 14 includes a plurality of irrigation regions 30 (illustrated with grid lines 31). Although the irrigation regions 30 illustrated in FIG. 1B are substantially square, any shape can be used for the irrigation regions 30. For example, the geometry of each irrigation region 30 can be circular, oval, rectangular, triangular, trapezoidal, hexagonal, or can have another suitable configuration. Further, the golf hole 14 can utilize a combination of geometries for the irrigation regions 30. Additionally, the size of each irrigation region 30 can be varied. In one embodiment, each irrigation region 30 can be a square that is approximately 80 feet×80 feet. However, the irrigation region 30 can have a larger or smaller area, depending upon the design requirements of the irrigation units 20. In alternative embodiments, the irrigation region 30 can be 25 feet×25 feet, 40 feet×40 feet, 60 feet×60 feet, or 100 feet×100 feet, as non-exclusive examples.

In this embodiment, each irrigation region 30 is serviced by a corresponding irrigation unit 20. Further, in the embodiment illustrated in FIG. 1B, the irrigation regions 30 and the irrigation units 20 within the irrigation regions 30 are aligned in substantially straight rows along the golf hole 14, and are connected with subterranean irrigation lines 32 (some representative irrigation lines 32 are shown in phantom in FIG. 1B) to the fluid source 18.

As an overview, in one embodiment, each irrigation unit 20 is programmed to precisely apply the appropriate quantity of irrigation fluid 19, as necessary, to only those portions of the corresponding irrigation region 30 that require irrigation fluid 19. Additionally, in one embodiment, should the irrigation fluid 19 requirements change over time within the irrigation region 30, the irrigation unit 20 will accordingly modify the quantity of irrigation fluid 19 applied within the irrigation region 30, as provided herein.

The irrigation system 10 can use existing irrigation lines 32 in the event of a retrofit. Alternatively, the existing irrigation lines 32 can be abandoned, or a portion of the existing irrigation lines 32 can be utilized. Still alternatively, new irrigation lines 32 can be installed below the surface of the ground in any pattern necessary to effectuate the intent of the present invention. The irrigation lines 32 can be formed from plastics such as polyvinylchloride (PVC), various metals, or any other suitable materials.

Figure 1C:
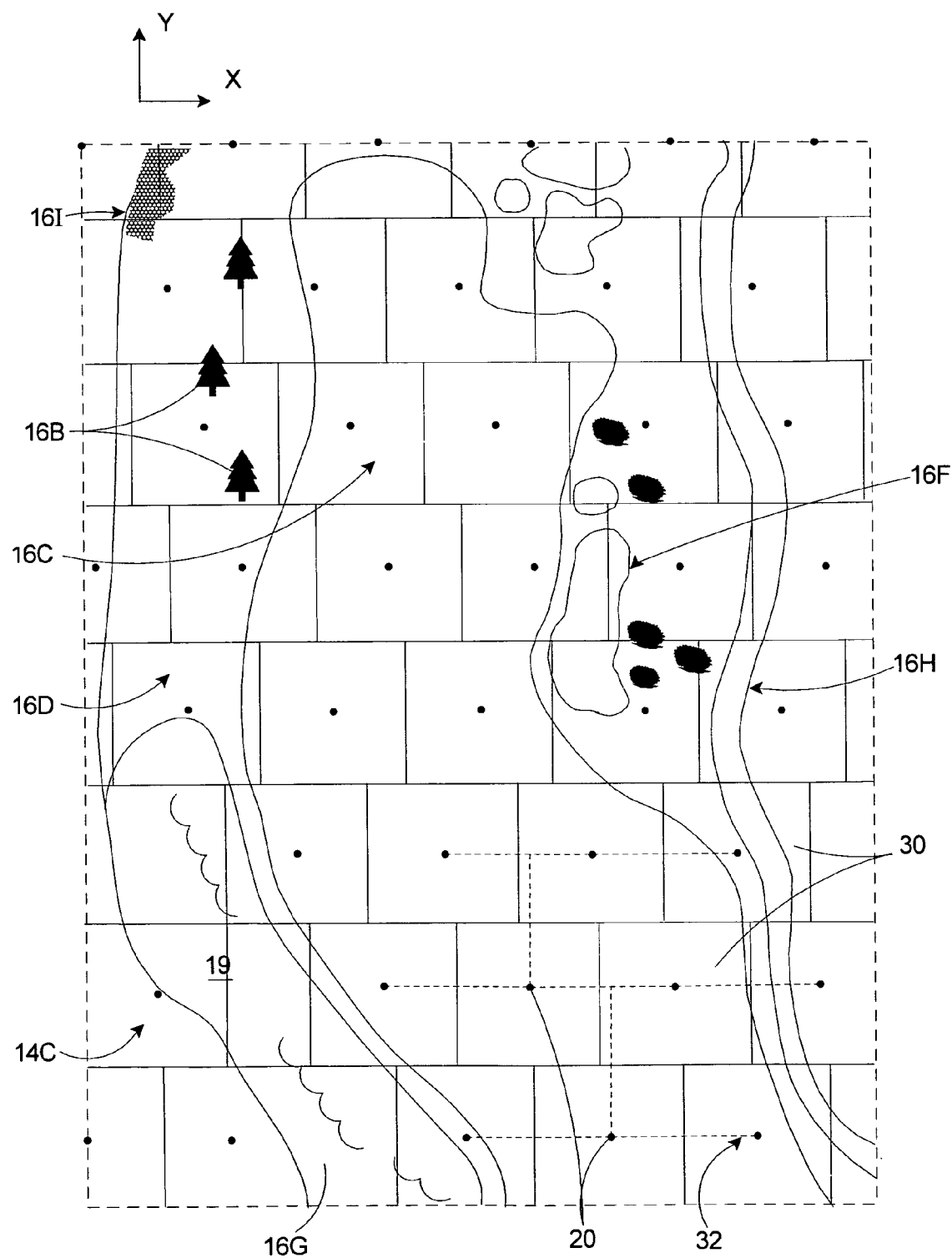
FIG. 1C is a detailed top plan view of a portion of the hole illustrated in FIG. 1A, including a second embodiment of a plurality of irrigation regions.

FIG. 1C is another embodiment of a portion of a golf hole 14C. In this embodiment, the irrigation units 20 are not aligned in rows. Instead, at least some of the irrigation units 20 can be offset along either the X axis, the Y axis, or along both the X and Y axes. Stated another way, the irrigation units 20 can be specifically positioned to increase the effective watering area of each irrigation unit 20. As used herein, the effective watering area of one irrigation unit 20 within one irrigation region 30 is defined as the percentage of the surface area within the irrigation region 30 that requires irrigation fluid 19. Thus, an irrigation unit 20 that is positioned immediately adjacent to the water feature 16G may have an effective watering area of approximately 50%. Other features 16F, 16H, 16I, 16J (illustrated in FIG. 1A) that do not require irrigation fluid 19 can influence the effective watering area upwards or downwards. In another example, an irrigation unit 20 that is positioned in the middle of the fairway 16C may have an effective watering area of approximately 100%.

For example, because arranging the irrigation units 20 in substantially straight rows can be somewhat functionally arbitrary, the effective watering area of one or more irrigation units 20 can be somewhat reduced due to the presence of one or more features 16A (illustrated in FIG. 1A), 16B-D, 16E (illustrated in FIG. 1A), 16F-J within the irrigation region 30. Thus, in the embodiment illustrated in FIG. 1C, the irrigation units 20 are positioned so that the effective watering area of each irrigation region 30 is optimized. It is recognized that the irrigation lines 32 must likewise be positioned to provide irrigation fluid 19 to the irrigation units 20, which may necessitate relocation of existing irrigation lines 32 in the event of a retrofit, or placement of new subterranean irrigation lines 32 for a new installation of the irrigation system 10.

Figure 1D:
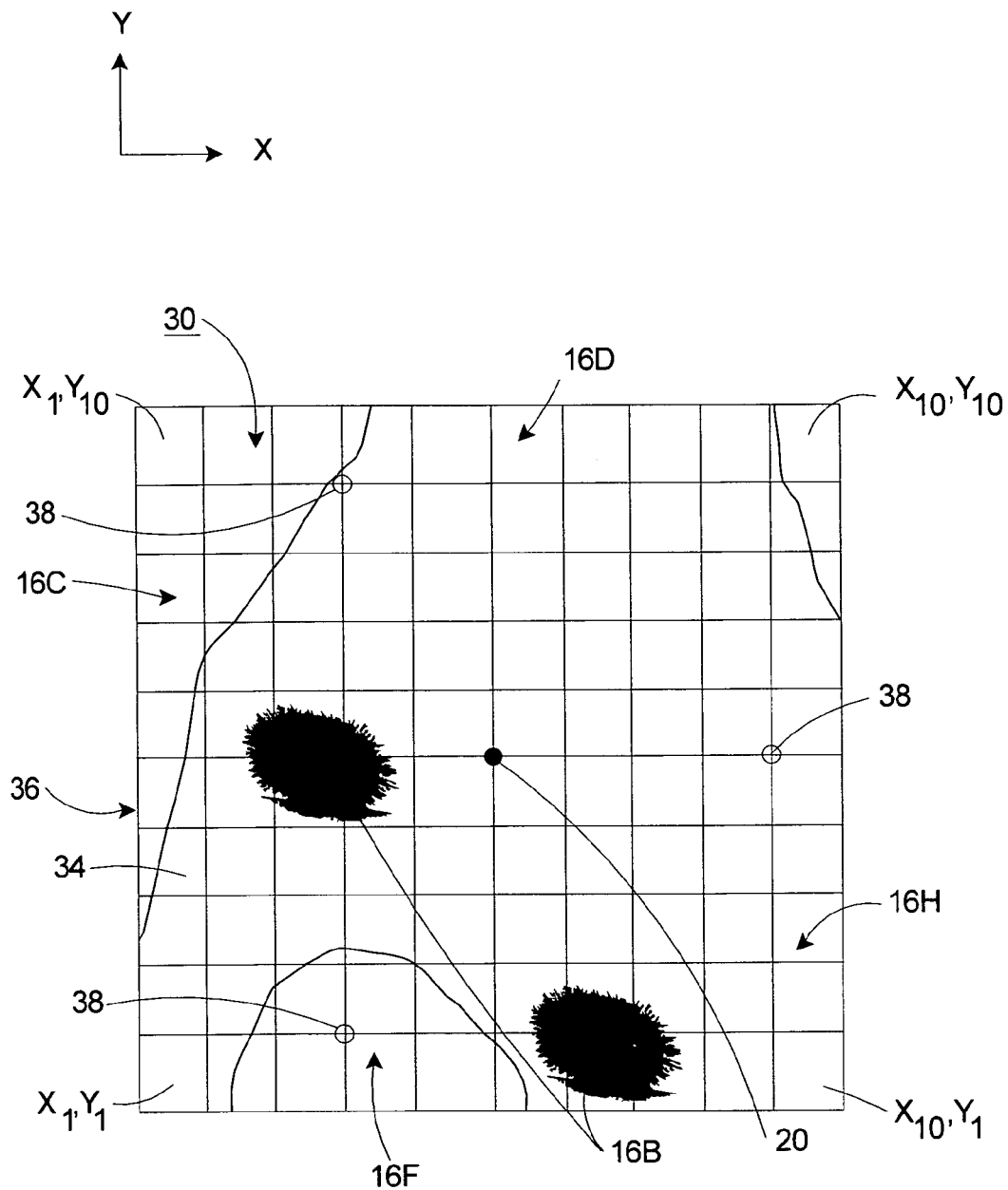
FIG. 1D is a detailed top plan view of one of the irrigation regions illustrated in FIG. 1C, including a plurality of irrigation subregions.

FIG. 1D is a detailed top plan view of a representative irrigation region 30 from the golf hole 14C illustrated in FIG. 1C. In this example, the irrigation region 30 includes the irrigation unit 20, vegetation 16B, a fairway 16C, rough 16D, a sand trap 16F, a cart path 16H, and one or more alignment guides 38. In one embodiment of the irrigation system 10, the irrigation region 30 is divided into a plurality of irrigation subregions 34 (also referred to herein as "subregions"). The size, number and configuration of the irrigation subregions 34 can vary depending upon the irrigation requirements of the golf course 12, the configuration of the irrigation region 30, and the features 16A-J included within the irrigation region 30, as examples.

For convenience, in the embodiment illustrated in FIG. 1D, the irrigation region 30 includes 100 substantially square irrigation subregions 34, arranged in a ten by ten grid pattern 36. In this embodiment, assuming an irrigation region having dimensions of 80 feet×80 feet, each irrigation subregion 34 would be 8 feet×8 feet. However, the grid pattern 36 can have any suitable dimensions. For example, the irrigation region 30 can be divided into a 20 by 20 grid pattern 36 so that the irrigation subregions 34 in this example would be 4 feet×4 feet.

In one embodiment, the subregions 34 of a given irrigation region 30 have approximately the same shape. In another embodiment, the subregions 34 of a give irrigation region 30 have approximately the same area. In still other embodiments, the subregions 34 can have differing shapes and/or areas within a given irrigation region 30. In yet another embodiment, the irrigation region 30 and/or the subregions 34 within the irrigation region 30 can be irregular in shape. Moreover, the subregions 34 can be arranged so that they do not overlap, as illustrated in FIG. 1D.

In the embodiment illustrated in FIG. 1D, the irrigation subregions 34 are arranged on a standard X-Y coordinate scale. In this example, the irrigation subregion 34 in the lower left-hand corner is referred to herein as subregion $(X_1, Y_1)$, the irrigation subregion 34 in the lower right-hand corner is referred to herein as subregion $(X_{10}, Y_1)$, the irrigation subregion 34 in the upper left-hand corner is referred to herein as subregion $(X_1, Y_{10})$, and the irrigation subregion 34 in the upper right-hand corner is referred to herein as subregion $(X_{10}, Y_{10})$. Further, the irrigation unit 20 is centrally positioned at the corner of subregions $(X_5, Y_5)$, $(X_5, Y_6)$, $(X_6, Y_5)$ and $(X_6, Y_6)$. However, the positioning of the irrigation unit 20 within the irrigation region 30 need not be centrally located. In fact, depending upon the configuration of the irrigation region 30 and the features 16A-J included within the irrigation region 30, it may be advantageous to offset the positioning of the irrigation unit 20.

The alignment guides 38 cooperate with the irrigation unit 20 to maintain proper positioning, calibration and/or orientation of the irrigation unit 20 within the irrigation region 30, as described in greater detail below. With this design, the irrigation unit 20 can more accurately deliver irrigation fluid 19 to specific subregions 34 in a manner that reduces irrigation in unwanted areas. In the embodiment illustrated in FIG. 1D, the irrigation region 30 includes three spaced apart alignment guides 38 that are radially positioned relative to the irrigation unit 20, although the number and positioning of the alignment guides 38 can vary. For example, a single alignment guide 38 can be used in conjunction with each irrigation unit 20. Alternatively, two alignment guides 38 or greater than three alignment guides 38 can be used.

One or more alignments guides 38 can be positioned within the irrigation region 30 as illustrated in FIG. 1D, or can be positioned outside of the irrigation region 30. Further, the alignment guides 38 can be fixedly positioned in the ground so that they are flush with or below the surface of the ground. In one embodiment, the alignment guide(s) 38 for one irrigation region 30 can be positioned on an irrigation unit 20 of another irrigation region 30. Alternatively, the alignment guides 38 can be positioned so that they are above the surface of the ground. For example, one or more of the alignment guides 38 can be suspended above the ground on the trunk of a tree, or on any substantially immovable structure that is positioned on the golf hole 14. Moreover, the alignment guides 38 can be at least a portion of any existing feature, manmade or natural, such as a rock, a tree, a wall, etc. Further, the shape and size of the alignment guides 38 can vary depending upon the design requirements of the irrigation system 10, the irrigation unit 20 and the golf course 12.

In one embodiment, the alignment guides 38 for a specific irrigation region 30 can each be positioned along the perimeter of the irrigation region 30. Alternatively, the alignment guides 38 can be positioned within the perimeter of the irrigation region 30. For example, in the embodiment illustrated in FIG. 1D, the alignment guides 38 can be positioned at approximately 80% to 90% of the distance from the irrigation unit 20 toward the perimeter of the irrigation region 30. Alternatively, the alignment guides 38 can be positioned any other distance from the irrigation unit 20. Further, the three alignment guides 38 can be positioned at approximately 120 degree angles (or any other suitable angles) from each other relative to the irrigation unit 20 so that the alignment guides 38 form a triangle that surrounds the irrigation unit 20. It is recognized that FIG. 1D represents only one of any number of possible configurations of the alignment guides 38 for one of the irrigation regions 30, and that the number and position of alignment guides 38 can vary widely. For instance, the alignment guides 38 can form another type of polygon that either surrounds or does not surround the irrigation unit 20.

In one embodiment, each alignment guide 38 is formed from a heat-absorbing and/or heat-emitting material. For instance, the alignment guide 38 can be formed from a material that emits a different amount of heat than the immediately surrounding area. In one embodiment, the alignment guide emits a greater amount of heat than the area that surrounds the alignment guide 38. Alternately, the alignment guide 38 can be formed from a material that absorbs a different wavelength of light than the immediately surrounding area. The alignment guide 38 can be formed at least in part from plastics, epoxy resins, metals, composite materials, magnetic materials or any other suitable materials.

Figure 1E:
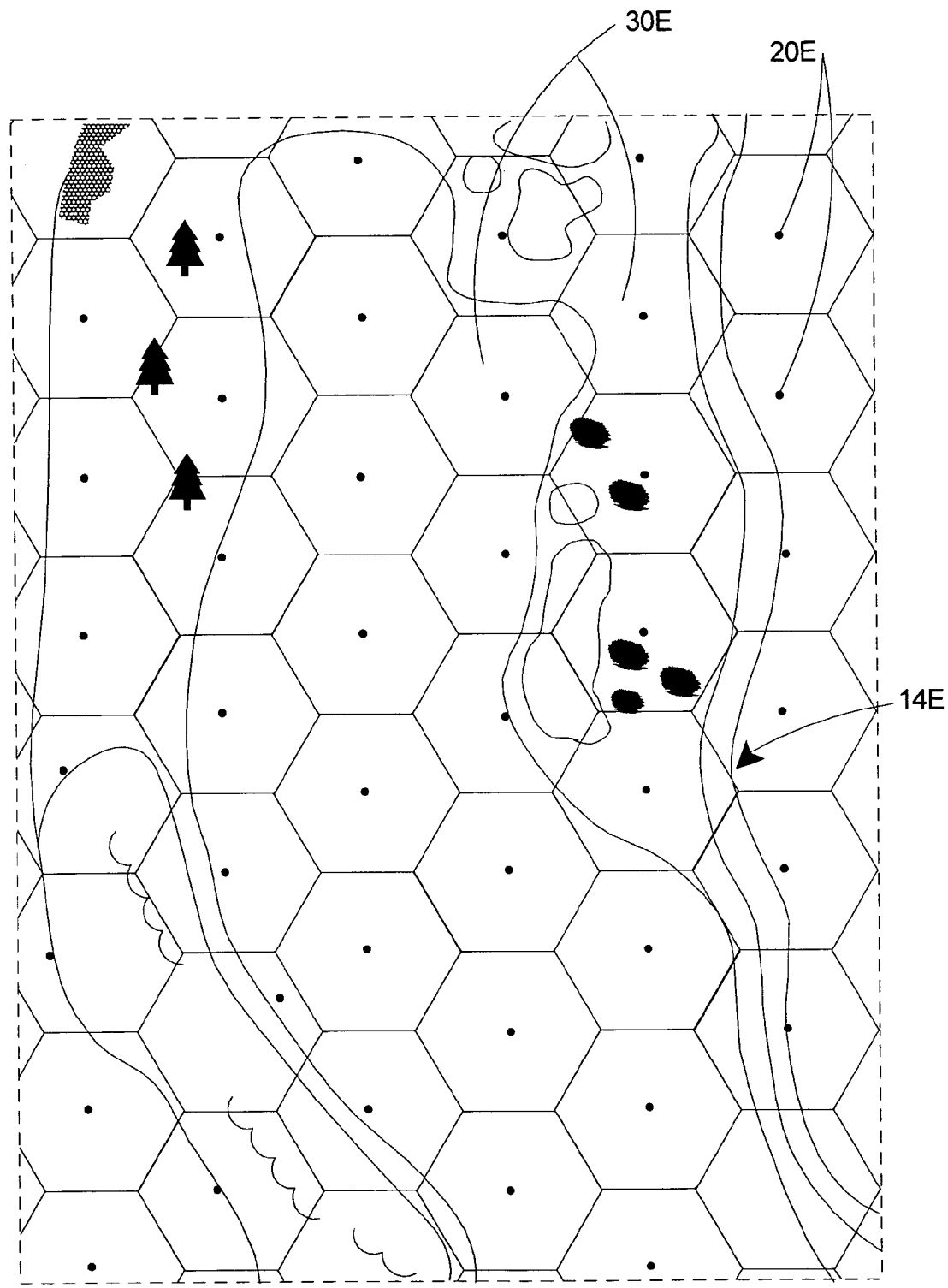
FIG. 1E is a detailed top plan view of a portion of the hole illustrated in FIG. 1A, including a third embodiment of a plurality of irrigation regions.

FIG. 1E is another embodiment of a portion of a golf hole 14E. In this embodiment, the irrigation units 20E are each positioned within a corresponding irrigation region 30E that is substantially hexagonal in shape. In the embodiment illustrated in FIG. 1E, the hexagonally-shaped irrigation regions 30E are arranged in a honeycomb pattern to increase the total area that is serviced by the irrigation units 20E on the golf hole 14E. However, it is recognized that the irrigation regions 30E can be arranged in any suitable configuration. Moreover, the size of each irrigation region 30E can vary depending upon the design of the irrigation units 20E and the overall topography of the golf course 12. Furthermore, the positioning of the irrigation unit 20E within the irrigation region 30E can vary, as illustrated in FIG. 1E. For example, the irrigation unit 20E can be centrally positioned within the irrigation region 30E, or the irrigation unit 20E can be off-center within the irrigation region 30E.

Figure 1F:
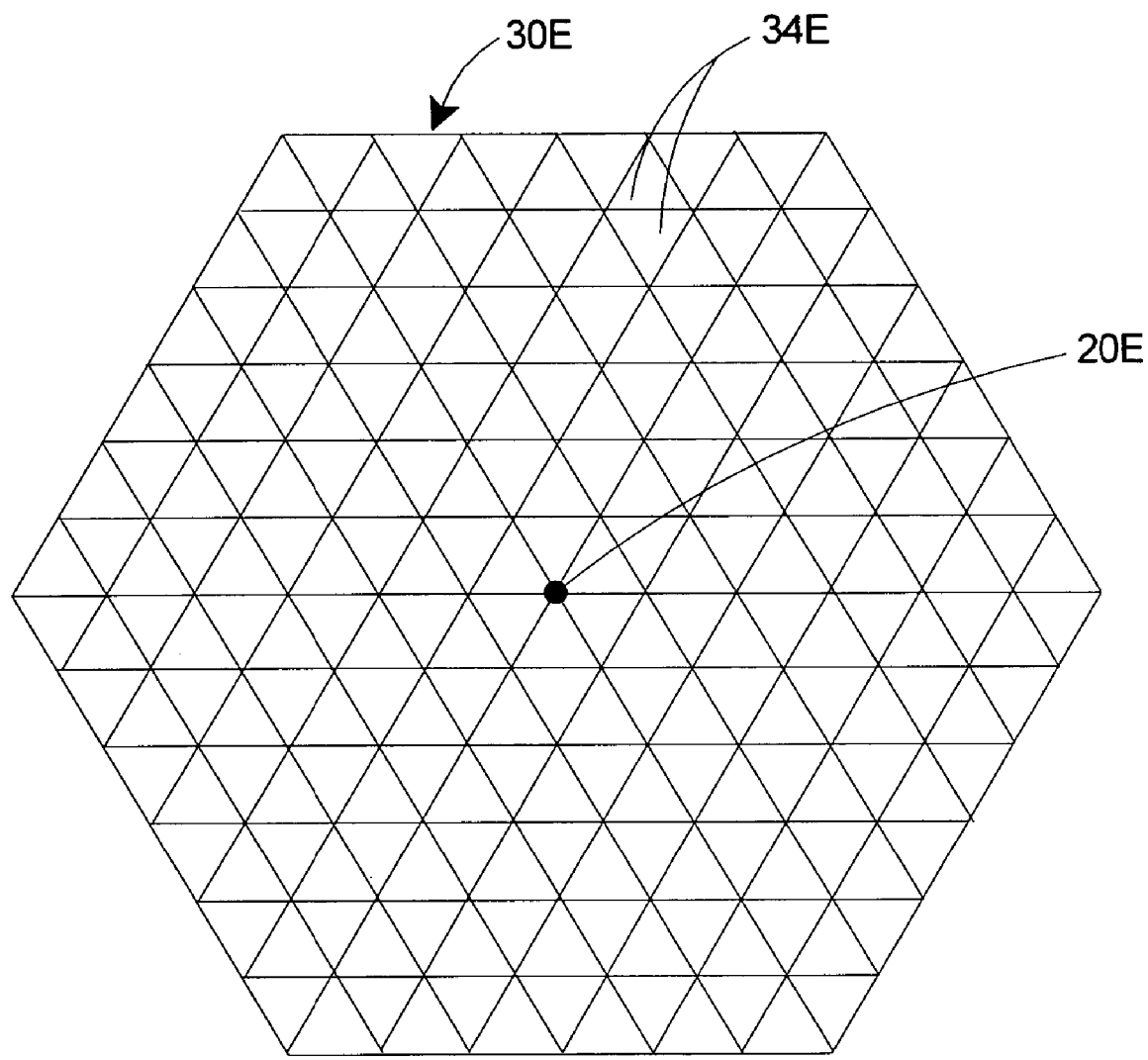
FIG. 1F is a detailed top plan view of one of the irrigation regions illustrated in FIG. 1E, including a plurality of irrigation subregions.

FIG. 1F is a detailed top plan view of a representative irrigation region 30E from the golf hole 14E illustrated in FIG. 1E. In this example, the irrigation region 30E includes the irrigation unit 20E. In one embodiment of the irrigation system 10, the irrigation region 30E is divided into a plurality of substantially identical, triangular-shaped subregions 34E. The size, number and configuration of the subregions 34E can vary depending upon the irrigation requirements of the golf course 12, the configuration and size of the irrigation regions 30E, and the overall topography within the irrigation region 30E, as examples. In the embodiment illustrated in FIG. 1F, the irrigation region 30E includes 216 subregions 34E, although this number is illustrated as a representative example only.

In alternative embodiments, the hexagonal irrigation region 30E can be divided into square or rectangular subregions 34 (illustrated in FIG. 1D), for example. In still another alternative embodiment, the irrigation region 30 can be circular, with the subregions 34 each having a wedge-shaped configuration.

The design of the irrigation unit 20 and the components of the irrigation unit 20 can be varied. One or more of the irrigation units 20 illustrated in FIG. 1A can have the features of the irrigation units 20 described herein. In one embodiment, the irrigation unit 20 can accurately and precisely irrigate each subregion 34 in the irrigation region 30 to the extent required. Additionally, the irrigation unit 20 can measure, monitor, and/or record (i) an irrigation fluid 19 temperature, (ii) an air temperature near the irrigation unit 20, (iii) a surface temperature of the individual subregions 34, (iv) the relative humidity near the irrigation unit 20, (v) the wind speed near the irrigation unit 20, (vi) the ambient light near the irrigation unit 20, (vii) an irrigation start time for the irrigation unit 20, (viii) an irrigation stop time for the irrigation unit 20, (ix) an amount of irrigation fluid utilized by the irrigation unit 20, and/or (x) a color of ground and/or ground covering at each individual subregion 34. Further, the irrigation unit 20 can self-test the positioning of the irrigation unit 20 and/or self-test the components of the irrigation unit 20.

Figure 2A:
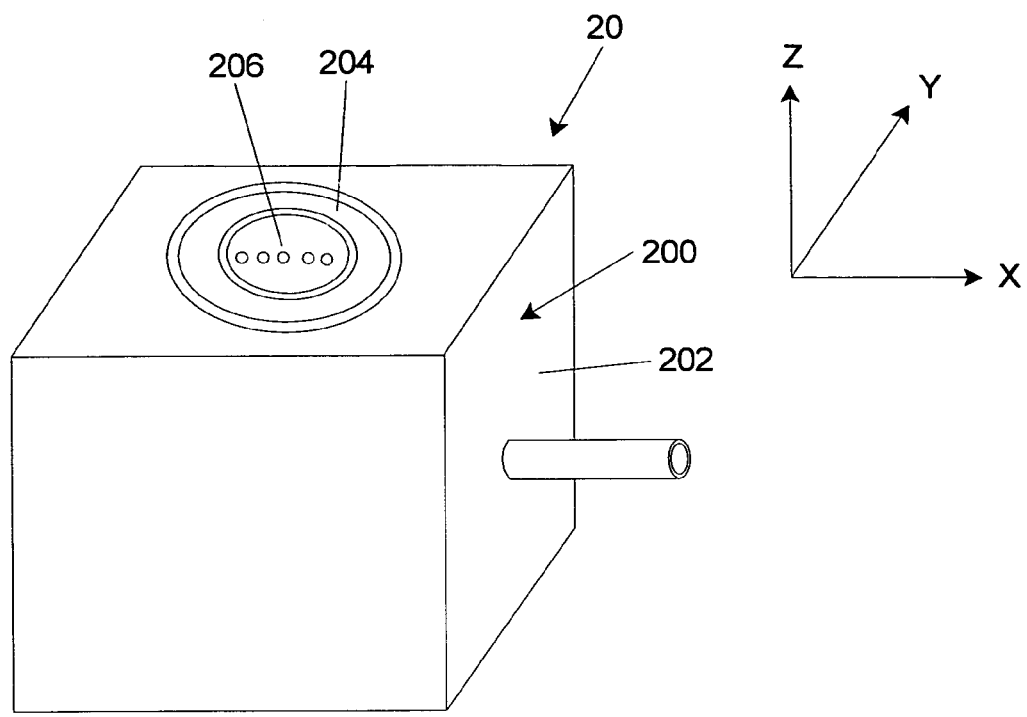
FIG. 2A is a perspective view of an irrigation unit having features of the present invention illustrated in a retracted position.

FIG. 2A is a perspective view of one embodiment of the irrigation unit 20. In this embodiment, the irrigation unit 20 is retractable and includes a unit housing 200 having a first section 202, a second section 204, and a third section 206. Alternatively, the unit housing 200 can include more than three or less than three sections. For example, the unit housing 200 can be a unit that does not retract.

In FIG. 2A, the irrigation unit 20 is illustrated in the retracted position. In this position, the third section 206 is retracted into the second section 204, and the second and third sections 204, 206 are retracted into the first section 202. With this design, the irrigation unit 20 can be positioned in the ground so that in the retracted position, the entire irrigation unit 20 is at, near or below the surface of the ground.

Figure 2C:
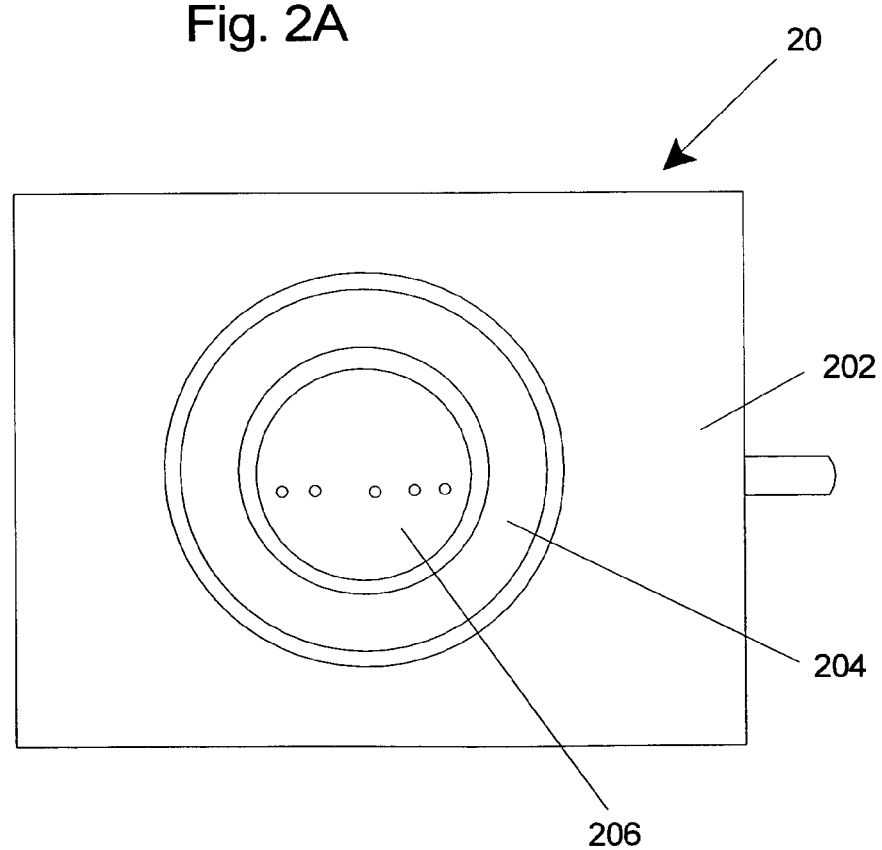
FIG. 2C is a top plan view of the irrigation unit illustrated in FIG. 2A.
Figure 2B:
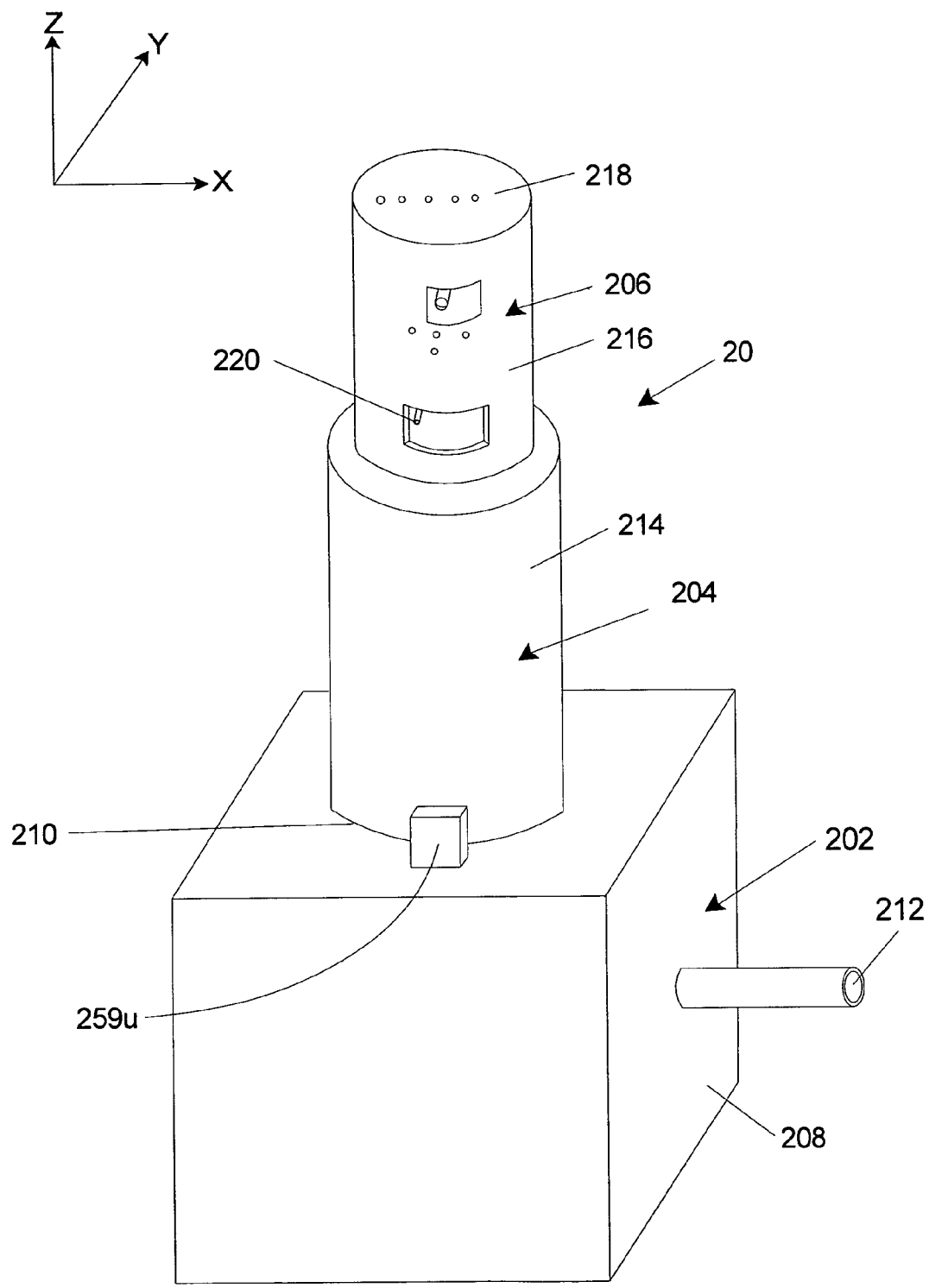
FIG. 2B is a perspective view of the irrigation unit illustrated in FIG. 2A in an extended position.

FIG. 2B is a perspective view of the irrigation unit 20 in the extended position with the second section 204 extended above the first section 202, and the third section 206 extended above the second section 204. In this embodiment, (i) the first section 202 includes a generally rectangular box-shaped first frame 208, an opening 210 for receiving the second section 206 and a water inlet 212 that is in fluid communication with the fluid source 18, (ii) the second section 204 includes a generally annular tube-shaped second frame 214, and (iii) the third section 206 includes a generally annular tube-shaped side 216, a generally disk-shaped top 218, and a nozzle 220. In this embodiment, the third section 206 is sized and shaped to fit into the second section 204, and the second section 204 is sized and shaped to fit into the first section 202. The height of the irrigation unit 20 in the extended position and the size of each section 202, 204, 206 can be designed to meet the requirements of the irrigation system 10 (illustrated in FIG. 1A). The first frame 208, the second frame 214, the side 216, and the top 218 can be made of plastic or another type of durable material.

In one embodiment, the joints between one or more of the sections 202, 204, 206 are sealed to inhibit water, dirt, and/or other contaminants from entering into the components inside the sections 202, 204, 206. Further, the top 218 can be substantially flat, or can have a convex shape to inhibit collection of irrigation fluid or rainwater, for example, on the top 218.

FIG. 2C is a top plan view of the irrigation unit 20, including the first, second, and third sections 202, 204, 206.

Figure 2D:
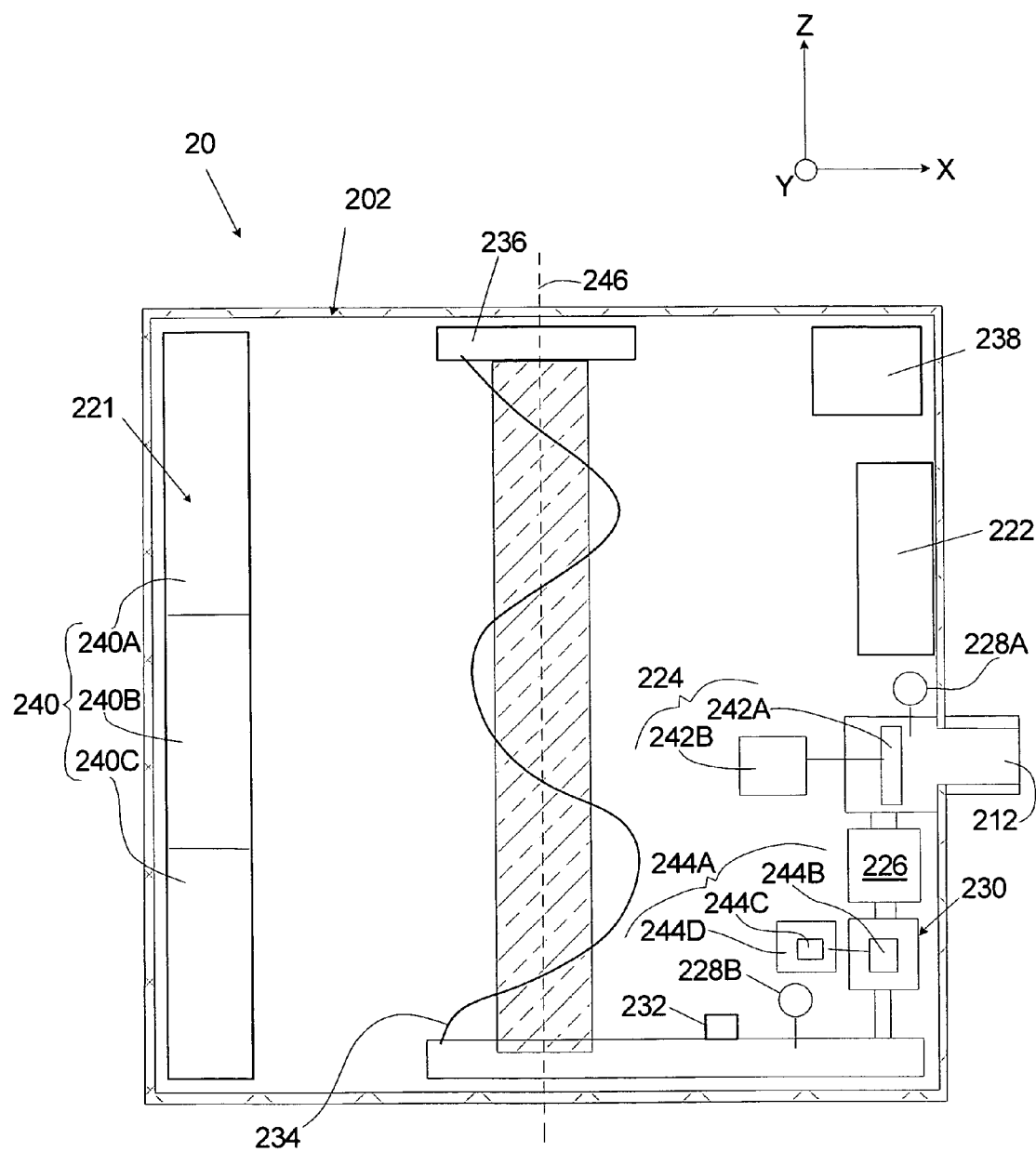
FIG. 2D is a cut-away view of a first section of the irrigation unit illustrated in FIG. 2A.

FIG. 2D is a cut-away view of the first section 202 of the irrigation unit 20. In this embodiment, the irrigation unit 20 includes a plurality of electronic components 221. In one embodiment, the irrigation unit 20 includes (i) a power storage unit 222, (ii) an electronic valve 224, (iii) a flow sensor 226, (iv) a first pressure sensor 228A and/or a second pressure sensor 228B, (v) a unit power source 230, (vi) a fluid temperature sensor 232, (vii) a flexible fluid conduit 234, (viii) a section mover 236, (ix) a section rotator 238, and (x) a unit control system 240. In this embodiment, these components are positioned in the first section 202. Alternatively, one or more of these components can be positioned in another section 204, 206 or in another location. It should be noted that not all of these components are necessary. For example, the auxiliary power source 24 (illustrated in FIG. 1A) can be used instead of the unit power source 230. Further, the orientation and/or positioning of these components can be changed.

In one embodiment, one or more of the sensors provided herein generates electronic data that relates to one or more parameters of the irrigation fluid 20, and/or one or more parameters of the surrounding environment.

The power storage unit 222 stores electrical energy so that the electronic components of the irrigation unit 20 can function if the unit power source 230 is not providing power. In one embodiment, the power storage unit 222 directly transfers electrical energy to one or more of the electronic components of the irrigation unit 20. In one embodiment, the power storage unit 222 only transfers electrical power to the irrigation unit 20.

Non-exclusive examples of a suitable power storage unit 222 include one or more capacitors and/or batteries. The power storage unit 222 is in electrical communication with the unit control system 240 and some of the other components of the irrigation unit 20. In one embodiment, the power storage unit 222 is recharged by the unit power source 230.

In one embodiment, the power storage unit 222 is positioned within the housing 200 and is secured directly or indirectly to the housing 200. In an alternative embodiment, the power storage unit 222 is positioned near and outside the housing 200. In alternative, non-exclusive embodiments, for example, the power storage unit 222 can be within approximately 1, 5, 10, 50, 100 or 1000 yards of the housing 200.

The electronic valve 224 is used to turn flow of the irrigation fluid 19 on and off, control the rate of the flow and/or pressure of the irrigation fluid 19 that is delivered to the nozzle 220 (illustrated in FIG. 2B) from the water inlet 212. One example of an electronic valve 224 includes a valve 242A, and a valve mover 242B that precisely moves and positions the valve 242A. The valve 242A can be a gate valve, ball valve or another type of valve, and the valve mover 242B can be a solenoid or another type of actuator. In this embodiment, the valve mover 242B is electrically controlled by the unit control system 240 to selectively adjust the flow and/or pressure of the irrigation fluid 19 to the nozzle 220. In the embodiment illustrated in FIG. 2D, the electronic valve 224 is in fluid communication with the water input 212 and the flow sensor 226.

As alternative examples, the electronic valve 224 can be selectively and alternatively controlled so that the flow of the irrigation fluid 19 from the water input 212 to the nozzle 220 can be completely on, completely off, or 10, 20, 30, 40, 50, 60, 70, 80, 90 or 95 percent of the flow from the water input 212 if the electronic valve 224 was not present. Stated another way, the electronic valve 224 can be selectively and alternatively controlled so that the valve 242A is completely open, completely closed, or 10, 20, 30, 40, 50, 60, 70, 80, 90 or 95 percent open or any percentage open.

The flow sensor 226 measures the flow of the irrigation fluid 19 to the nozzle 220. Suitable flow sensors 226 include a flow meter or turbine wheel with an electronic counter. The first pressure sensor 228A measures the pressure of the irrigation fluid 19 that is being delivered to the irrigation unit 20 and the second pressure sensor 228B measures the pressure of the irrigation fluid 19 that is being delivered to the nozzle 220. Suitable pressure sensors 228A, 228B include a pressure gauge, electrical compression piles or a pressure changing transducer.

The unit power source 230 generates electrical energy, provides electrical energy to the electronic components 221 of the irrigation unit 20, is in electrical communication with the electronic components 221 of the irrigation unit 20, and/or charges the power storage unit 222. Further, the unit power source 230 can directly transfer electrical energy to one or more of the electronic components 221 of the irrigation unit 20. In one embodiment, the unit power source 230 only transfers electrical power to the electronic components 221 of the irrigation unit 20.

In one embodiment, the unit power source 230 is a turbine type generator 244A that includes a turbine 244B that rotates a rotor 244C relative to a stator 244D to generate electrical energy. In one embodiment, the turbine 244B is in fluid communication with at least a portion of the irrigation fluid 19 that is being delivered to the nozzle 220. With this design, flow of the irrigation fluid 19 causes the turbine 244B to rotate and power to be generated. In alternative embodiments, the turbine 244B can include one or more fan blades, spline blades, or a squirrel cage fan that is rotated.

In one embodiment, the unit power source 230 can include an electronic voltage regulator (not shown) that regulates the voltage generated by the unit power source 230.

Figure 2E:
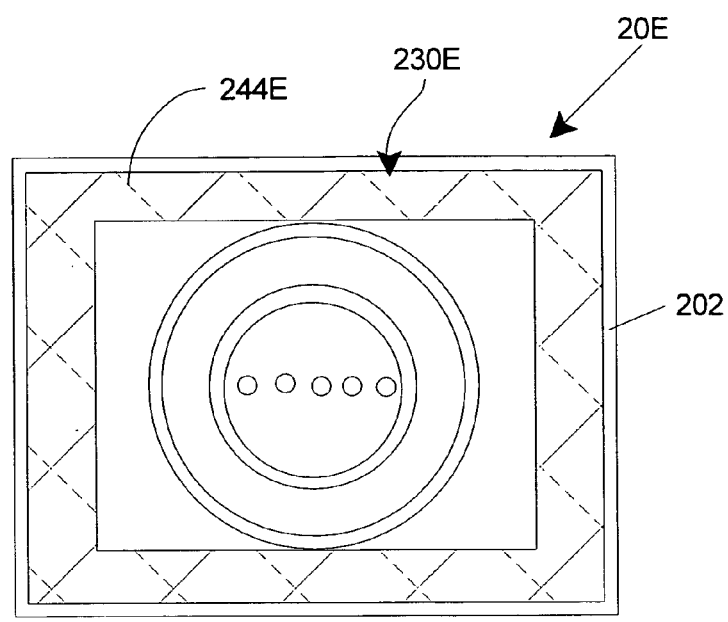
FIG. 2E is a top plan view of an alternative irrigation unit having features of the present invention.

Alternatively, the unit power source 230 can include another type of power generator. For example, FIG. 2E illustrates a top plan view of another embodiment of an irrigation unit 20E that includes an alternative example of a unit power source 230E. More specifically, in this embodiment, the unit power source 230E is a solar type generator that includes a solar panel 244E. In this embodiment, the solar panel 244E is mounted on the top of the first section 202. Alternatively, the solar panel 244E can be mounted on another area of the irrigation unit 20E or near the irrigation unit 20E.

Alternatively, the unit power source 230 can include another type of generator, such as an electrolysis unit, a wind type generator, or a fuel cell. Still alternatively, the irrigation unit 20 can be designed without the unit power source 230 and the irrigation unit 20 can be electrically connected to the auxiliary power source 24 (illustrated in FIG. 1A) with one or more power lines.

In one embodiment, the unit power source 230 is positioned within the housing 200 and is secured directly or indirectly to the housing 200. In an alternative embodiment, the unit power source 230 is positioned near and outside the housing 200. In alternative, non-exclusive embodiments, for example, the unit power source 230 can be within approximately 1, 5, 10, 50, 100 or 1000 yards of the housing 200.

In an alternative embodiment, power is transferred to one or more irrigation units 20 from the auxiliary power source 24 (illustrated in FIG. 1A). For example, one or more of the irrigation units 20 can be electrically connected to the auxiliary power source 24 with standard electrical lines. Alternatively, one or more of the irrigation units 20 can be electrically connected to the auxiliary power source 24 via the irrigation lines 32. In this embodiment, power is transferred from the auxiliary power source 24 through the irrigation fluid 19 in the irrigation lines 32.

Referring back to FIG. 2D, the fluid temperature sensor 232 measures the temperature of the irrigation fluid 19 that is delivered to the nozzle 220. Suitable fluid temperature sensors 232 include a thermistor or other electronic devices that change resistance or capacitance with changes of temperature.

The flexible fluid conduit 234 connects the water input 212 in fluid communication with the nozzle 220 and allows the nozzle 220 to be moved up and down and rotated. Suitable fluid conduits 234 include a rubber tube or another type of flexible conduit.

The section mover 236 moves the second section 204 (illustrated in FIG. 2B) and/or the third section 206 up and down vertically along a unit longitudinal axis 246 (along the Z axis) relative to the first section 202 between the retracted position and the extended position. The section mover 236 can include one or more movers, such as rotary motors, voice coil motors, linear motors utilizing a Lorentz-type force to generate drive force, electromagnetic movers, planar motors, or some other force movers. In another embodiment, the second section 204 and/or the third section 206 can move up and down using irrigation fluid pressure.

The section rotator 238 rotates the third section 206 and/or the nozzle 220 about the unit longitudinal axis 246 (about the Z axis) relative to the first section 202. The section rotator 238 can include one or more movers, such as rotary motors, voice coil motors, linear motors utilizing a Lorentz force to generate drive force, electromagnetic movers, planar motors, or some other force movers.

The unit control system 240 is in electrical communication with many of the components of the irrigation unit 20 and controls many of the components of the irrigation unit 20. In one embodiment, the unit control system 240 includes a printed circuit board 240A, an electronic processor 240B, and/or a data storage device 240C. The electronic processor 240B processes electronic data and can include one or more conventional CPU's. In one embodiment, the electronic processor 240B is capable of high volume processing and database searches. The data storage device 240C stores electronic data and algorithms for controlling operation of the irrigation unit 20 as described below. The data storage device 240C can include one or more magnetic disk drives, optical storage units, random access memory (RAM), read only memory (ROM), electronically alterable read only memory (EAROM), and/or flash memory, as non-exclusive examples.

In one embodiment, the unit control system 240 can receive and store information from (i) the flow sensor 226 regarding flow of the irrigation fluid, (ii) the fluid temperature sensor 232 regarding the temperature of the irrigation fluid 19, and (iii) the pressure sensors 228A, 228B regarding the pressure of the irrigation fluid 19. Additionally, the unit control system 240 can receive and store information from other components of the irrigation unit 20 as described below. Alternately, for example, one or more of these components can provide the information directly to the main control system 22 (illustrated in FIG. 1A).

Moreover, for example, the unit control system 240 can control (i) the electronic valve 224 to precisely control the flow rate and/or pressure of the irrigation fluid 19 to the nozzle 220, (ii) the section mover 236 to precisely control the position of the second and/or third sections 204, 204, along the Z axis and the position of the nozzle 220 along the Z axis, and/or (iii) the section rotator 238 to precisely control the rotational position of the second and third sections 204, 206, about the Z axis and the rotational position of the nozzle 220 about the Z axis, the X axis and/or the Y axis. With this design, the nozzle 220 can effectively oscillate back and forth, and up and down relative to the irrigation region 30. Additionally, the unit control system 240 can control other components of the irrigation unit 20 as described below. Alternately, for example, one or more of these components can be controlled directly or indirectly by the main control system 22.

In one embodiment, the unit control system 240 is in electrical communication with the main control system 22. For example, the unit control system 240 can communicate with the main control system 22 and transfer data from the irrigation unit 20 to the main control system 22 on a periodic basis or continuous basis. For example, the unit control system 240 can communicate with the main control system 22 and can (i) upload data to the main control system 22, (ii) download data from the main control system 22, (iii) download new programming from the main control system 22, (iv) download new firmware from the main control system 22, and/or (v) download new software from the main control system 22, (vi) detect missing or disabled irrigation units 20, and can selectively enable and/or disable one or more irrigation units 20. Additionally, the unit control system 240 can communicate with the main control system 22 if there are problems with the irrigation unit 20 and/or any of the ground coverings in any of the subregions 34. Moreover, delays or breaks in communication between the unit control system 240 and the main control system 22 can signal problems with the irrigation system 10.

Figure 2H:
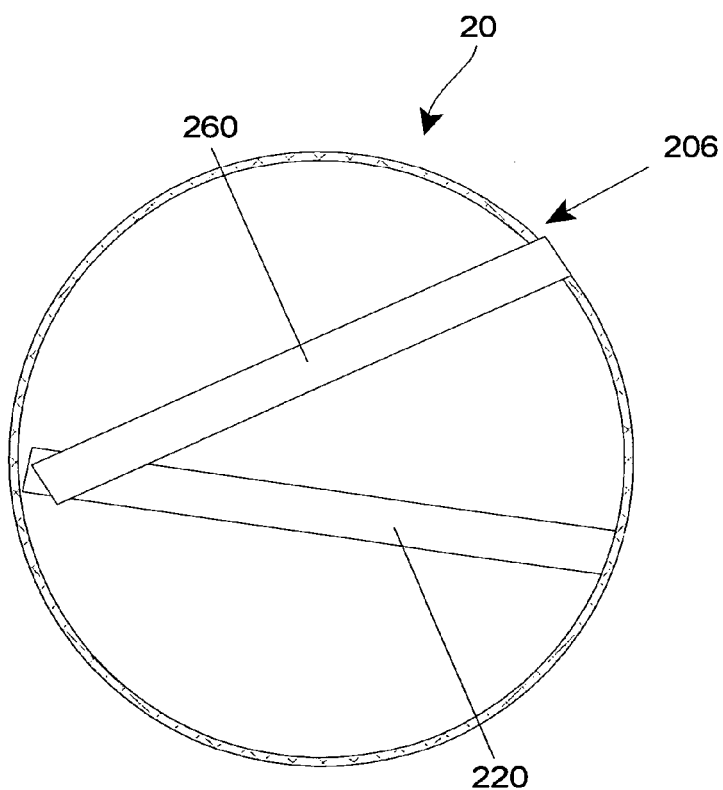
FIG. 2H is a cut-away view of the third section of the irrigation unit taken on line 2H-2H in FIG. 2F.
Figure 2F:
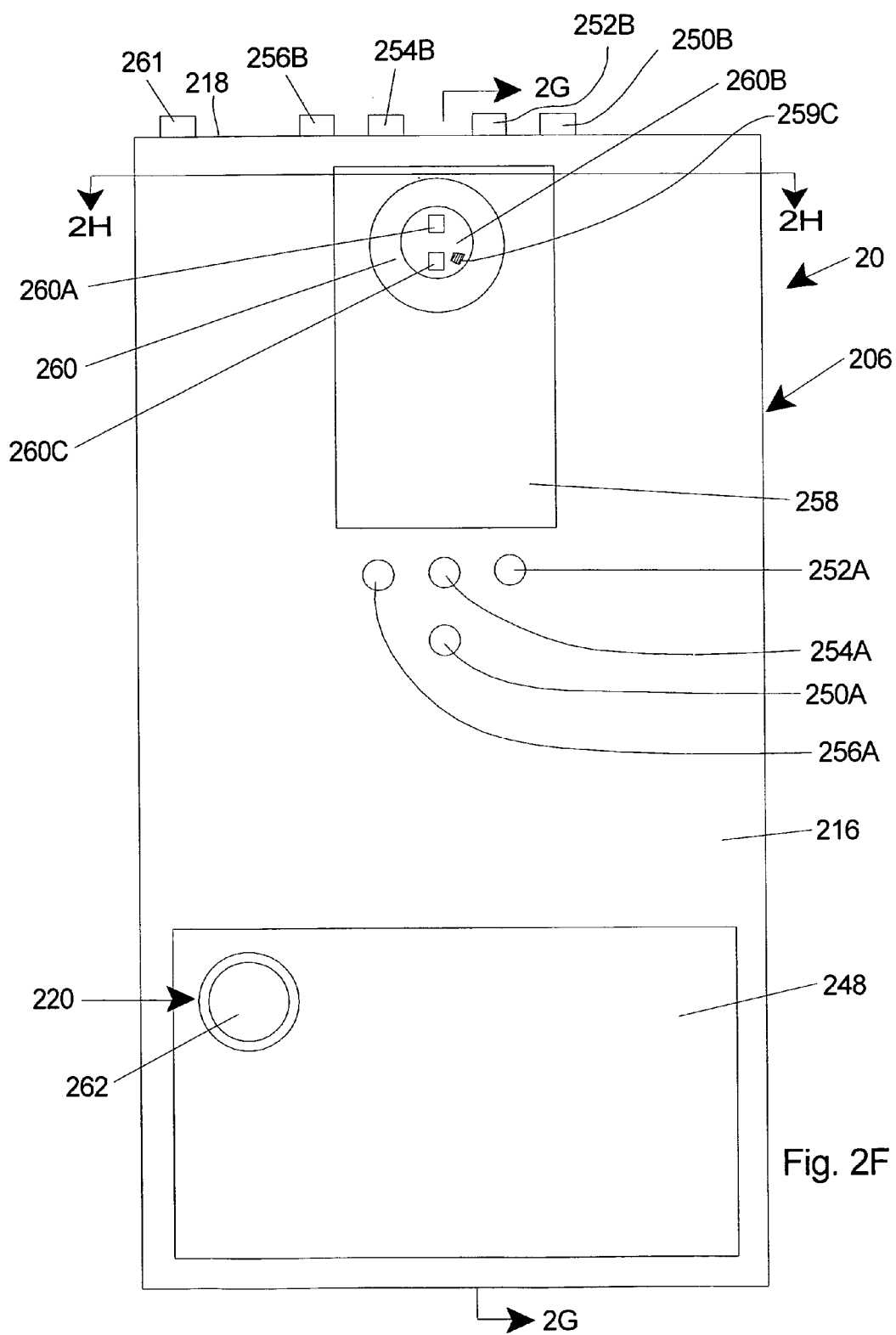
FIG. 2F is a front plan view of a third section of the irrigation unit illustrated in FIG. 2A.

FIG. 2F is a front plan view of the third section 206 of the irrigation unit 20. In this embodiment, the third section 206 includes (i) a nozzle opening 248, (ii) the nozzle 220, (iii) a first wind speed sensor 250A and/or a second wind speed sensor 250B, (iv) a first light sensor 252A and/or a second light sensor 252B, (v) a first humidity sensor 254A and/or a second humidity sensor 254B, (vi) a first air temperature sensor 256A and/or a second air temperature sensor 256B, (vii) a subregion sensor opening 258, (viii) a subregion sensor 260, and (ix) an electrical interface 261. In this embodiment, one or more of these components are positioned in or on the third section 206. Alternatively, one or more of these components can be positioned in or on another section 202, 204 or in another location. Further, one or more of these components can be positioned flush with the top 218. It should be noted that not all of these components may be necessary for the operation of the irrigation unit 20.

The nozzle opening 248 extends through the side 216 of the third section 206, allows the nozzle 220 to be positioned inside the third section 206 and direct the irrigation fluid 19 outside the third section 206, and allows the nozzle 220 to be moved relative to the side 216. The size and shape of the nozzle opening 248 can be varied to suit the movement requirements of the nozzle 220. In FIG. 2F, the nozzle opening 248 is generally rectangular shaped.

The nozzle 220 releases and directs the irrigation fluid 19 to the various subregions 34. In one embodiment, the nozzle 220 is generally tubular shaped and includes a nozzle opening 262 that directs a stream of the irrigation fluid at the respective subregion to reduce the amount of evaporation when the air is hot and/or dry. In one embodiment, to obtain an accurate and even distribution of the irrigation fluid 19 to the various subregions 34, the nozzle 220 is oscillated both up and down and sideways, right and left. This allows the stream to evenly cover and distribute the irrigation fluid 19. Alternatively, for example, the nozzle 220 could be designed to have a pulsed stream, a spray or a pulsed spray. Still alternatively, for example, the valve mover 242B can move the valve 242A to achieve a pulsed spray or other spray pattern.

In one embodiment, in the extended position, the nozzle 220 is approximately 12 inches above the ground. Alternatively, for example, the nozzle 220 can be more than or less than 12 inches above the ground.

The wind speed sensors 250A, 250B measure the wind speed near the irrigation unit 20. In one embodiment, the first wind speed sensor 250A measures wind speed when the irrigation unit 20 is in the extended position and the second wind speed sensor 250B measures wind speed when the irrigation unit 20 is in the retracted position. Suitable wind speed sensors 250A, 250B include a thermistor with a heater. Measuring how fast the thermistor changes resistance can be correlated to wind speed.

The light sensors 252A, 252B measure the light near the irrigation unit 20. In one embodiment, the first light sensor 252A measures the light when the irrigation unit 20 is in the extended position and the second light sensor 252B measures the light when the irrigation unit 20 is in the retracted position. Suitable light sensors 252A, 252B include various photo cells and light sensitive electronics sensitive to visible light.

The humidity sensors 254A, 254B measure the humidity near the irrigation unit 20. In one embodiment, the first humidity sensor 254A measures the humidity when the irrigation unit 20 is in the extended position and the second humidity sensor 254B measures humidity when the irrigation unit 20 is in the retracted position. Suitable humidity sensors 254A, 254B include a hygrometer and other moisture sensitive electronic devices sensitive to moisture.

The air temperature sensors 256A, 256B measure the air temperature near the irrigation unit 20. In one embodiment, the first air temperature sensor 256A measures the air temperature when the irrigation unit 20 is in the extended position and the second air temperature sensor 256A measures the air temperature when the irrigation unit 20 is in the retracted position. Suitable air temperature sensors 256A, 256B include a thermistor or other temperature sensitive electronic devices.

The subregion sensor opening 258 extends through the side 216 of the third section 206, allows the subregion sensor 260 to be positioned inside the third section 206 and monitor the subregions 34 outside the third section 206, and allows the subregion sensor 260 to be moved relative to the side 216. The size and shape of the subregion sensor opening 258 can be varied to suit the movement requirements of the subregion sensor 260. In FIG. 2F, the subregion sensor opening 258 is generally rectangular shaped.

The subregion sensor 260 monitors the status of one or more of the subregions 34 in the irrigation region 30. In one embodiment, the subregion sensor 260 directly or indirectly measures the temperature at a portion of each subregion 34. In another embodiment, the subregion sensor 260 can be used to directly or indirectly measure the moisture content of a portion of one or more subregions 34. For example, in this embodiment, the subregion sensor 260 can be used in conjunction with one or more other sensors to measure the temperature of a portion of a subregion 34, the humidity and/or the air temperature. This information can then be used in an algorithm to indirectly determine the moisture content of the portion of the subregion 34. Additionally, or alternatively, the subregion sensor 260 can measure or detect the color or other features of the surface covering of each subregion 34. For example, the subregion sensor 260 can determine which subregions 34 have the desired color, e.g. green, and which subregions 24 are turning an undesired color, e.g. brown.

In one embodiment, the subregion sensor 260 can include an infrared sensor 260A that receives an infrared signal. In this embodiment, the infrared sensor 260A can be sequentially directed at each individual irrigation subregion 34 to independently receive an infrared signal at each individual irrigation subregion 34 to individually measure the subregion temperature at each subregion 34. Additionally, in one embodiment, the subregion sensor 260 can include a lens 260B that intensifies the light collected by the subregion sensor 260. For example, the lens 260B can be a lenticular or Fresnel type lens that is designed to optimize the IR signal and concentrate it on the IR sensor 260A.

Additionally or alternatively, for example, the subregion sensor 260 can include a visible light detector 260C that is sequentially directed at each individual irrigation subregion 34. In this embodiment, the lens 260B can be designed and optimized for the low incidence angle for the visible and infrared wavelengths. In still alternative embodiments, the subregion sensor 260 can include an optical sensor or a pattern recognition sensor, as non-exclusive examples.

In one embodiment, in the extended position, the subregion sensor 260 is approximately 24 inches above the ground. Alternatively, for example, the subregion sensor 260 can be more than or less than 24 inches above the ground.

In one embodiment, the lenses and sensors can be coated with a high density non-stick coating 259C (illustrated as shading) such as polytetraflouroethylene to inhibit adhesion of material, such as dirt, chemicals, water minerals, impurities, and deposits to the lenses and sensors.

Additionally, referring back to FIG. 2B, the irrigation unit 20 can include a cleaner unit 259U that can be used to clean one or more of the lenses and/or sensors. For example, the cleaner unit 259U can include (i) a nozzle to direct irrigation fluid, water or a cleaning fluid on one or more of the lenses and/or sensors and/or (ii) a material such as cloth or chamois that can wipe one or more of the lenses and/or sensors.

The electrical interface 261 allows for an external control system 326 (illustrated in FIG. 3) to interface with the unit control system 240. In one embodiment, the electrical interface 261 is an input jack that is electrically connected to the unit control system 240. In this embodiment, the external control system 326 includes an electrical connector that inputs into the input jack. In another embodiment, for example, the electrical interface 261 can be an electrical receiver/transmitter that interfaces with a receiver/transmitter of the external control system 326 to allow for data transfer within the irrigation system 10 between the systems 326, 240. With these designs, the external control system 326 is either wirelessly, visible light, or invisible light, inductively, or capacitively coupled to the unit control system 240.

It should be noted, for example, in an alternative embodiment, that the electrical interface 261 can be mounted on the top edge of the section 202.

The unit control system 240 (illustrated in FIG. 2C) is in electrical communication with and receives information from the wind speed sensors 250A, 250B, the light sensors 252A, 252B, the humidity sensors 254A, 254B, the air temperature sensors 256A, 256B, and the subregion sensor 260. Stated another way, the unit control system 240 monitors and stores on a programmable periodic basis, air temperature, humidity, wind speed and visible light with times. Alternately, for example, one or more of these components can provide the information directly or indirectly to the main control system 22 (illustrated in FIG. 1A).

Based on the data gathered by the unit control system 240, the unit control system 240 can determine which subregions 34 need irrigation, the best time to irrigate, and the appropriate quantity to irrigate.

Additionally, with this information problems with the irrigation unit 20 and/or the ground covering in each subregion 34 can be detected and reported to the main control system 22.

In one embodiment, based on the information received by the unit control system 240, the unit control system 240 using algorithms based on the previous data, e.g. recorded air temperature, humidity, wind speed and/or visible light, can determine how much irrigating, if any, needs to be done.

Figure 2G:
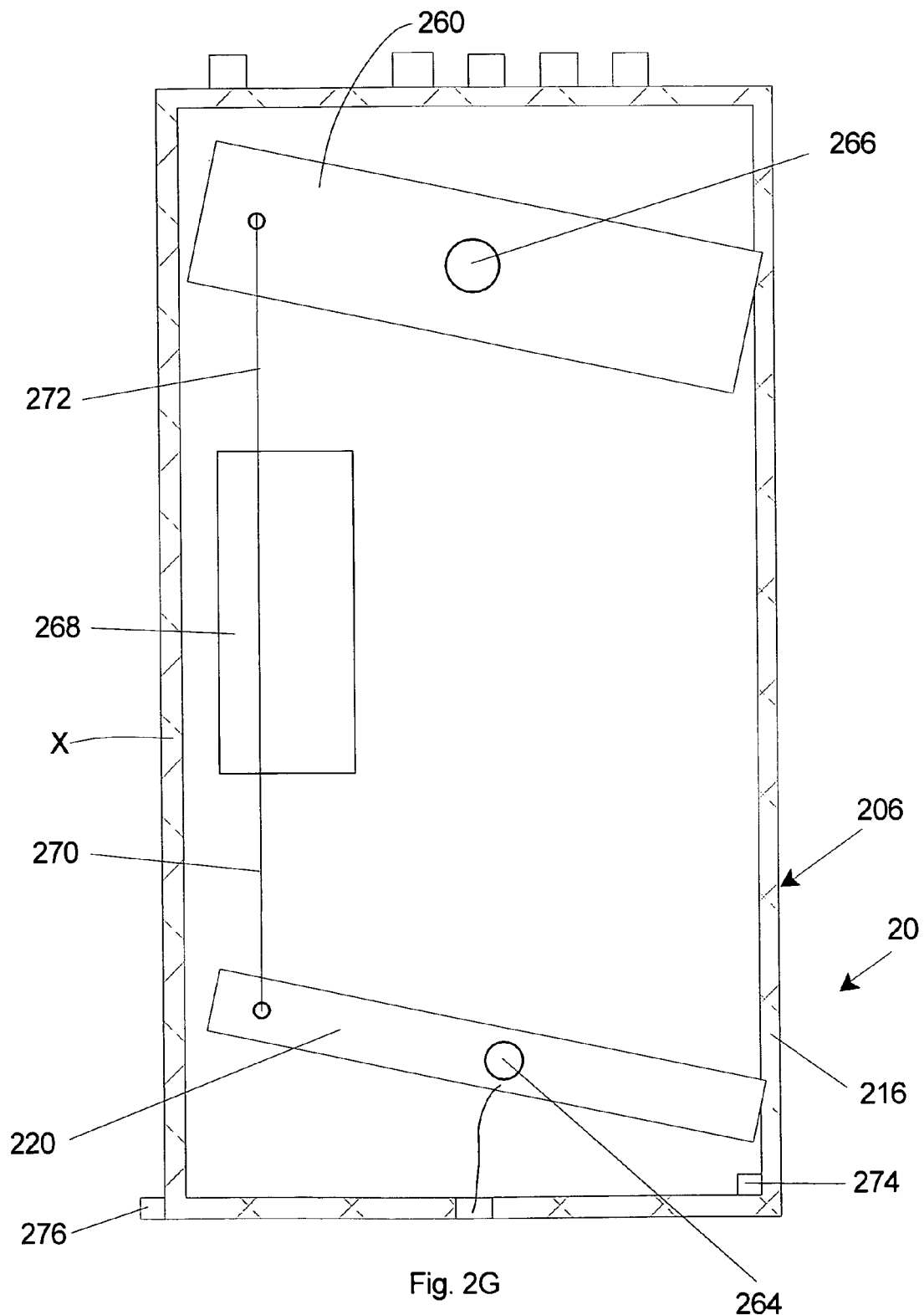
FIG. 2G is a cut-away view of the third section of the irrigation unit taken on line 2G-2G in FIG. 2F.

FIG. 2G is a cut-away view of one embodiment of the third section 206 of the irrigation unit 20. FIG. 2G illustrates that the irrigation unit 20 includes (i) a nozzle pivot 264 that secures the nozzle 220 to the side 216 of the third section 206 and allows the nozzle 220 to pivot relative to the third section 206, (ii) a sensor pivot 266 that secures the subregion sensor 260 to the side 216 of the third section 206 and allows the subregion sensor 260 to pivot relative to the third section 206, and (iii) a nozzle mover 268 that moves and pivots the nozzle 220 and the subregion sensor 260 relative to the third section 206. The nozzle mover 268 can include one or more movers, such as rotary motors, voice coil motors, actuators, linear motors utilizing a Lorentz-type force to generate drive force, electromagnetic movers, planar motors, or some other force movers. In FIG. 2F, the nozzle mover 268 is coupled with a nozzle linkage 270 to the nozzle 220 and a sensor linkage 272 to the subregion sensor 260. With this design, the nozzle mover 268 concurrently moves both the nozzle 220 and the subregion sensor 260. Alternatively, for example, separate movers (not shown) can be used to individually move the nozzle 220 and the subregion sensor 260. Still alternatively, the nozzle 220 and the subregion sensor 260 can be fixedly attached together and can move together.

The unit control system 240 can control the nozzle mover 268 to precisely control the position of the nozzle 220 and the subregion sensor 260. With this design, by controlling the section mover 236 (illustrated in FIG. 2D), the section rotator 238 (illustrated in FIG. 2D), and the nozzle mover 268, the unit control system 240 can individually and selectively direct the subregion sensor 260 at each subregion 34 and receive information from each subregion 34. Further, with this design, by controlling the section mover 236, the section rotator 238 (illustrated in FIG. 2D), and the nozzle mover 268, and the electronic valve 224 (illustrated in FIG. 2D), the unit control system 240 can individually and selectively direct the irrigation fluid 19 from the nozzle 220 at any one or every one of the subregions 34. Alternatively, for example, one or more of these components can be controlled directly or indirectly by the main control system 22.

As used herein, the section mover 236, the section rotator 238 and the nozzle mover 268 are individually and/or collectively referred to as a nozzle mover assembly. As provided herein, the nozzle mover assembly can include additional movers to position and move the nozzle 220 and/or the subregion sensor 260.

In the embodiment illustrated in FIG. 2G, the irrigation unit also includes a nozzle sensor 276 and a rotation sensor 278. The nozzle sensor 276 can detect the relative positioning of the nozzle 220 about one or more axes. In other words, the nozzle sensor 276 can sense the angle of the nozzle 220 about any axis, and can transmit this information to the unit control system 240. The unit control system 240 can use this information to determine whether the nozzle 220 is properly angularly positioned to irrigate the desired subregion 34. In an alternative embodiment, the position of the nozzle 220 can be determined by monitoring the amount of current (or other power) that has been directed to the nozzle mover assembly, e.g. to move the nozzle 220 from a predetermined starting position.

The positioning of the nozzle sensor 276 can be varied depending upon the design requirements of the irrigation unit 20. In this embodiment, the nozzle sensor 276 is positioned in the interior of the third section 206. In an alternative embodiment, the nozzle sensor can be positioned on the nozzle, or in another suitable location.

The rotation sensor 278 can detect the rotation of the third section 206, and thus the nozzle 220, relative to the second section 204, the first section 202, the sprinkler housing 200 and/or the irrigation region 30. In other words, the rotation sensor 278 can monitor the 360 degree rotational positioning of the third section 206 to determine whether the third section 206 is properly oriented to deliver irrigation fluid 19 to the desired subregion 34. The rotation sensor 278 transmits this information to the unit control system 240. The unit control system 240 can use this information to determine whether the nozzle 220 is accurately rotationally positioned to irrigate the desired subregion 34. In an alternative embodiment, the position of the third section 206, and thus the rotational position of the nozzle 220, can be determined by monitoring the amount of current (or other power) that has been directed to the section rotator 238, e.g. to move the third section 206 from a predetermined starting position.

The positioning of the rotation sensor 278 can be varied depending upon the design requirements of the irrigation unit 20. In this embodiment, the rotation sensor 278 is positioned on the exterior of the third section 206. In an alternative embodiment, the rotation sensor 278 can be positioned in the interior of the third section 206, on the exterior or in the interior of the second section 204, or in another suitable location.

With this design, the unit control system 240 accurately (i) controls the movement of the nozzle 220 head up, down or around, (ii) controls the pressure and flow of the irrigation fluid 19 to the nozzle 220, and/or (iii) turns the irrigation fluid 19 on and off, including when the nozzle 220 is directed at sand traps 16F, cart paths 16H, water features 16G, walkways 16J, or other areas where irrigation fluid 19 is not necessarily desired. In this manner, the irrigation unit 20 is able to accurately and individually irrigate each subregion 34 of each irrigation region 30 to the desired level, and in the required order. This can result in virtually no overlap between adjacent irrigation units 20, and therefore, little or no wasted irrigation fluid 19, thereby saving costs for both irrigation fluid 19 and electricity to pump the irrigation fluid 19.

FIG. 2H is a cut-away view of the third section 206 of the irrigation unit 20. FIG. 2H illustrates that in one embodiment, the subregion sensor 260 is offset from the nozzle 220. The amount of offset can vary. For example, the subregion sensor 260 can be offset approximately 90 degrees of the nozzle 220. Alternatively, the offset can be greater or less than 0 degrees.

In FIG. 2H, the nozzle 220 pivots near the end of the nozzle 220. Alternatively, for example, the nozzle 220 can pivot at the center of the nozzle 220 or about another area.

Figure 2I:
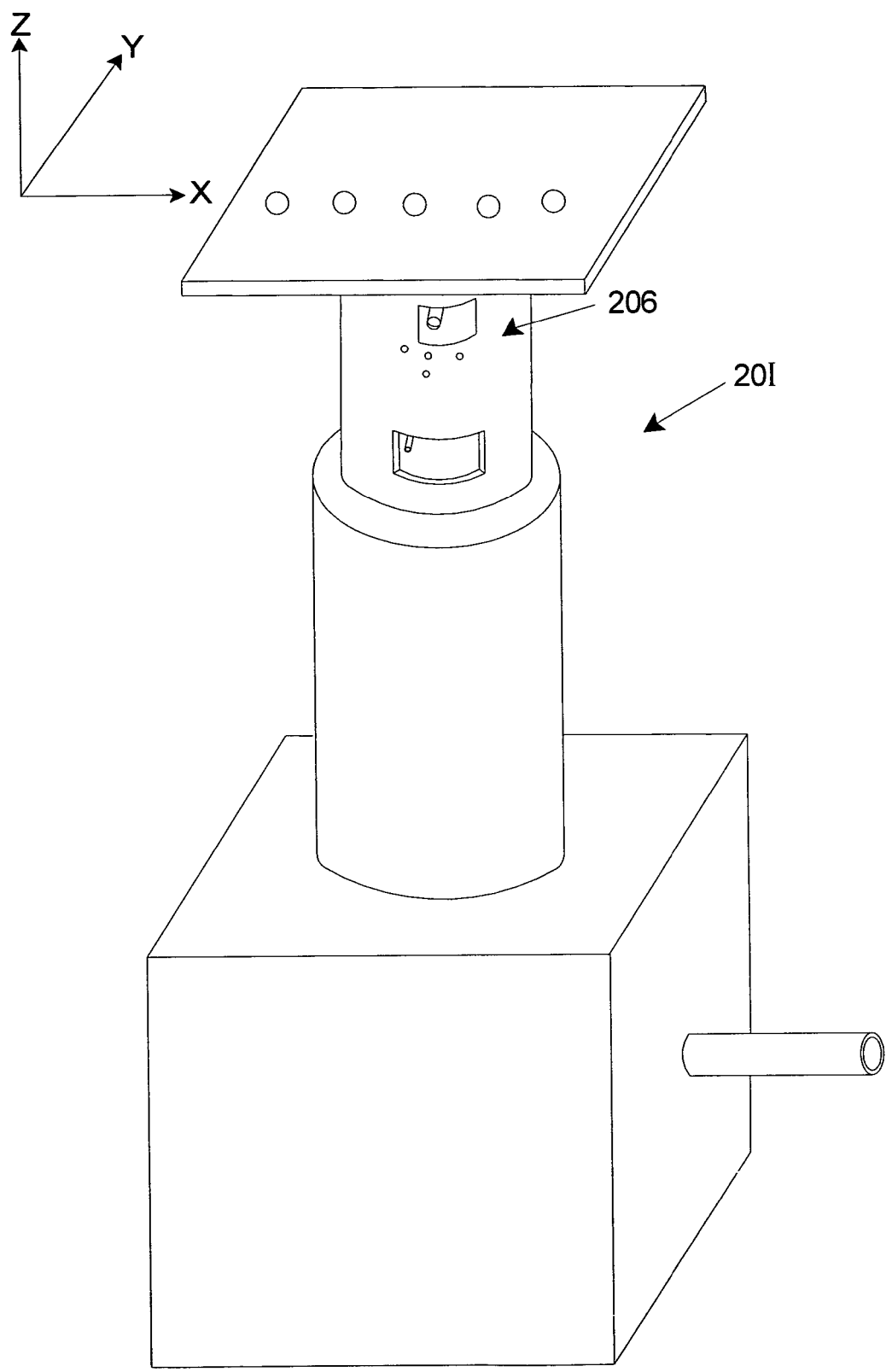
FIG. 2I is a perspective view of another embodiment of the irrigation unit.

FIG. 2I is a perspective view of another embodiment of the irrigation unit 20I. In this embodiment, the irrigation unit 20I includes a protective cover 274 that distributes the load and protects the irrigation unit 20I. In FIG. 2I, the protective cover 274 is a flat or slightly convex plate that is secured to the top of the third section 206. The composition of the protective cover 274 can vary, provided the protective cover is sufficiently rigid to withstand forces from pedestrians, golf carts and other vehicles, golf bags, pull carts, tractors, lawnmowers, other landscaping equipment or any other forces that could possibly damage the irrigation units 20I.

Figure 2J:
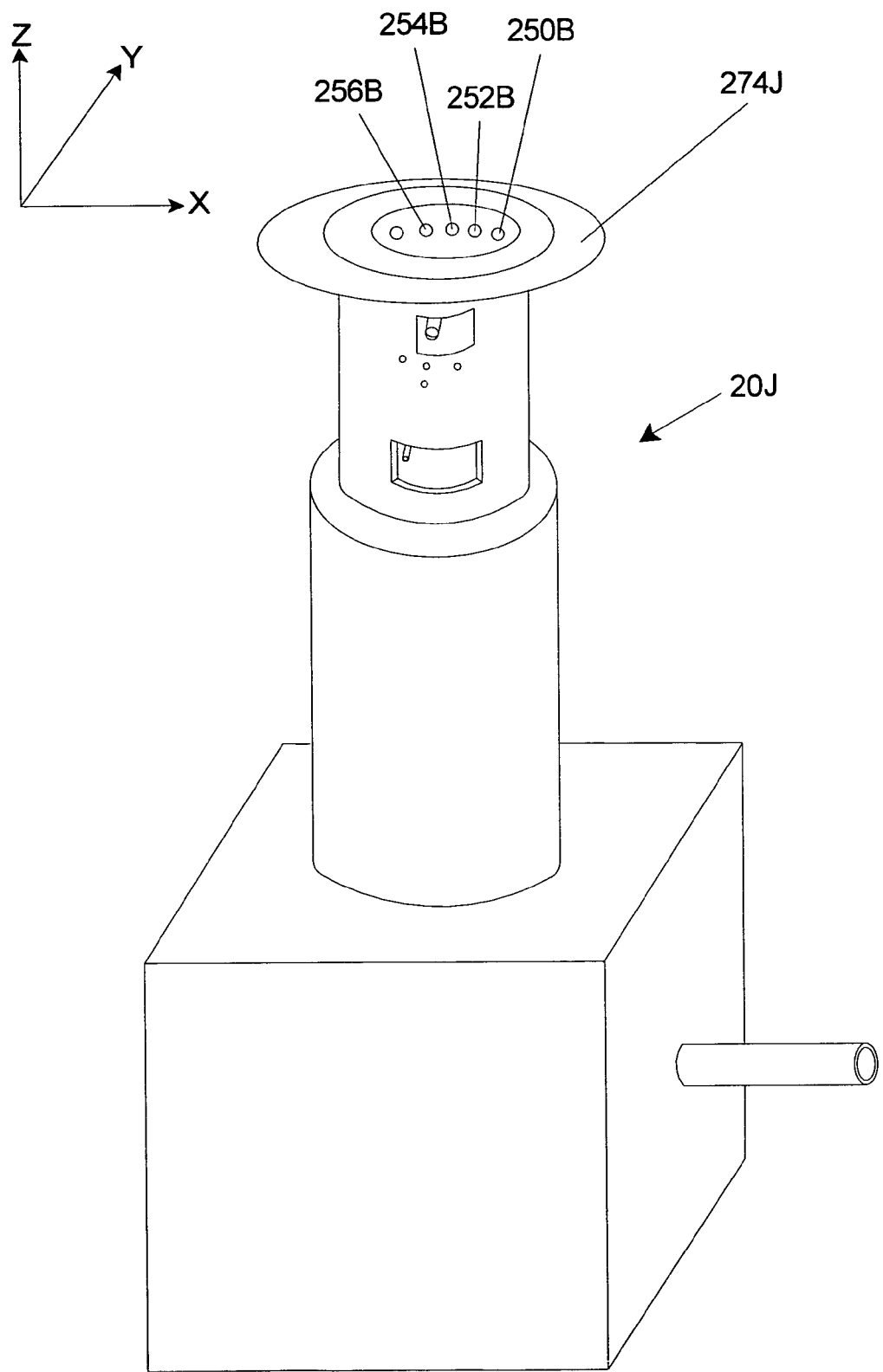
FIG. 2J is a perspective view of yet another embodiment of the irrigation unit.

FIG. 2J is a perspective view of still another embodiment of the irrigation unit 20J. In this embodiment, the protective cover 274J is slightly curved or convex shaped so that water and other debris fall more easily off the cover 274J. With this design, the sensors 250B, 252B, 254B, 256B are less likely to be covered. Still alternatively, the protective cover can have another shape such as slightly pitched, slightly concave, arched, or slightly inclined.

Referring back to FIG. 1D, in one embodiment, at one or more times, e.g. at programmable time intervals, the irrigation unit 20 also verifies the relative positioning of the irrigation unit 20 and adjusts and/or corrects the position of the nozzle 220 (illustrated in FIG. 2B) as needed. If the position cannot be corrected by the irrigation unit 20, a signal can be sent to the main control system 22 so that the irrigation unit 20 is manually repositioned or otherwise recalibrated or fixed. Thus, if the irrigation unit 20 is damaged or moved, it can correct the problem or notify the main control system 22 via the unit control system 240.

In one embodiment, the subregion sensor 260 is utilized to determine if the nozzle 220 is directing the irrigation fluid 19 to the appropriate desired area. For example, the alignment guides 38 (illustrated in FIG. 1D) for a particular irrigation region 30 are monitored with the subregion sensor 260 prior to or during irrigation to determine if the nozzle 220 is being correctly positioned to irrigate these positions. In FIG. 1D, the alignment guides 38 are located approximately 120 degrees apart at about 80% to 90% of the distance of the irrigation distribution throw. The subregion sensor 260 can locate and monitor these positions to make certain that the positioning of the nozzle 220 is true and accurate. In one embodiment, the unit control system 240 is programmed to know where these alignment guides 38 are located within the irrigation region 30.

On a periodic or continual basis, the subregion sensor 260 can locate one or more of the alignment guides 38 for the specific irrigation region 30 based on information that can be initially programmed into the unit control system 240. Stated another way, the unit control system 240 can cause the subregion sensor 260 to be positioned to detect heat or a specific wavelength of light from the alignment guides 38 in a specific direction based on an initial positioning of the alignment guides 38 relative to a portion of the irrigation unit 20, such as the subregion sensor 260, for example. In another embodiment, the subregion sensor 260 can detect a particular physical pattern or signature that is imprinted or impregnated on the alignment guide 38.

If, however, the irrigation unit 20 moves from its initial orientation, i.e. from impact with a golf cart, vandalism, or any other unwanted movement, and the subregion sensor 260 is unable to detect one of the alignment guides 38 at its initial position, the unit control system 240 can cause one or more of the actuators to oscillate the subregion sensor 260 up and down, side to side, or both, until the alignment guide 38 is located by the subregion sensor 260. Once one or more of the alignment guides 38 are located in this manner by the subregion sensor 260, information regarding the extent of the necessary oscillation until such alignment guide(s) 38 were located, i.e. angle, direction and/or distance, is provided by the subregion sensor 260 to the unit control system 240 for processing. The unit control system 240 can then determine the extent to which the irrigation unit 20 has been moved, dislodged, disoriented or the like, from its initial orientation, along or about any axis.

Once this extent is determined, the unit control system 240 can adjust the flow rate of irrigation fluid 19 to the nozzle 220 and/or the positioning of the nozzle 220 accordingly, i.e. about or along any axis, so that the coordinates for each subregion 34 in the irrigation region 30 are effectively recalibrated and accurate irrigation is maintained. Stated another way, with the extent of misalignment determined, the unit control system 240 can compensate for the misalignment. The irrigation unit 20 can then be automatically or manually reprogrammed to effectively recalibrate the irrigation unit 20 based on its modified orientation relative to the alignment guides 38. With this design, any disruption or offset of irrigation of the irrigation region 30 can be reduced or eliminated despite unwanted movement of the irrigation unit 20 along or about any axis.

The way in which the position of the irrigation unit 20 relative to the alignment guides 38 is determined can vary. For example, the subregion sensor 260 can detect the heat, light or color to locate one or more alignment guides 38. Alternatively, for example, the subregion sensor 260 can send a signal that is reflected off of the alignment guides 38 to locate one or more alignment guides 38. Still alternatively, for example, one or more of the alignment guides 38 can send a signal that is received by the subregion sensor 260 to locate the alignment guides 38, or one or more of the alignment guides can include a sensor that determines the position of the irrigation unit 20.

Figure 3:
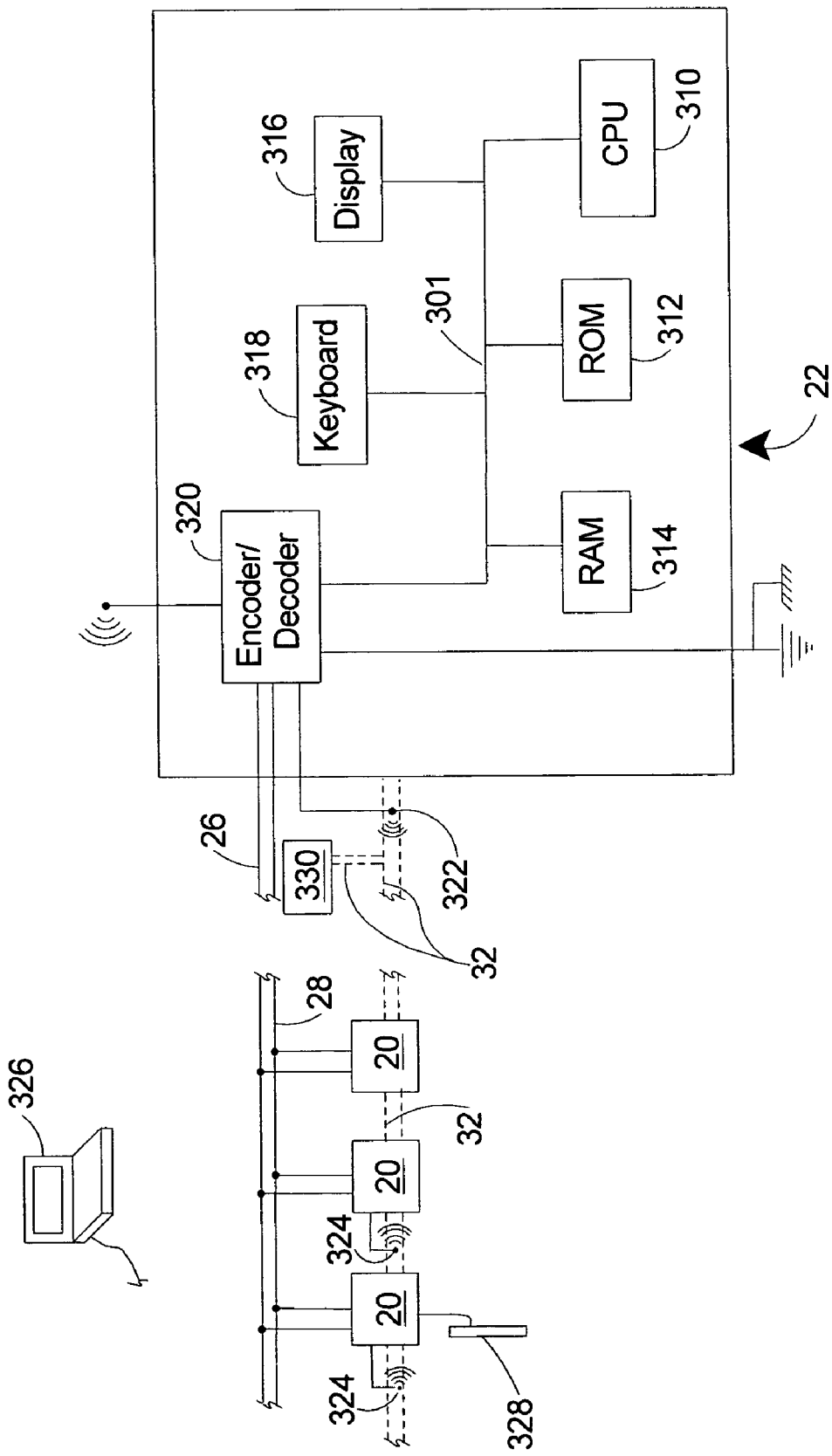
FIG. 3 is a simplified block diagram showing the electrical components of a main control system in communication with the irrigation units in accordance with the present invention.

FIG. 3 illustrates that the irrigation units 20 can be electrically connected and/or coupled to the main control system 22. It should be noted that one or more of the functions performed by the main control system 22 and described herein can be performed by one or more of the unit control systems 240 (illustrated in FIG. 2D). Further, one or more of the functions performed by the unit control systems 240 and described herein can be performed by the main control system 22.

The main control system 22 can include a personal computer (PC), or workstation, and can include (i) a central processing unit (CPU) 310, (ii) one or more forms of memory 312, 314 such as EPROM, EAROM, magnetic or optical storage drives, (iii) one or more peripheral units such as a keyboard 316 and a display 318, (iv) a data encoder/decoder unit 320 which provides two-way communication between the irrigation units 20 and the main control system 22, and/or (v) an internal bus 301 that electrically connects one or more of the components of the main control system 22. The data encoder/decoder unit 320 encodes data on the internal bus 301 under control of the CPU 310. The encoded data is then transmitted over the data line 28 to the irrigation unit(s) 20. Incoming data from the irrigation units 20 is decoded by the data encoder/decoder unit 320 and used by the CPU 310 and stored in one or more of the memory units 312, 314.

Alternatively, for example, the main control system 22 can communicate with the irrigation units 20 wirelessly using the irrigation fluid 19 flowing through the irrigation lines 32. In this case, for example, the encoded signals are transmitted by electromagnetic waves, DC/AC signal, visible or invisible light, or RF signals through the irrigation fluid 19 in the irrigation lines 32. The encoded signal is sent from an antenna, or aerial 322, located in the irrigation line 32, and electrically connected to the encoder/decoder 320 in proximity to the main control system 22, and this signal is transmitted through the irrigation fluid 19 flowing in the irrigation line 32. The signal is then received at the irrigation unit(s) 20 by another antenna 324 electrically connected to the unit control system 240 and located in the irrigation line 32 in proximity to the irrigation unit(s) 20. Additional connections (not shown) can be located in irrigation lines 32 and the ground proximate the main control system 22 and each irrigation unit 20, for transmitting and receiving the encoded signals via the earth and in combination with transmission via the irrigation fluid 19.

In the case of transmission of the encoded signals using electromagnetic waves or DC/AC signal, a ground to earth at the irrigation unit 20 and at the main control system 22 can be used. At the irrigation unit 20, the ground to earth can consist of a ground spike 328 (only one ground spike 328 is illustrated in FIG. 3) that is implanted into the earth near the irrigation unit 20, with a wire 330 connecting the ground spike to the irrigation unit 20. In another embodiment, the irrigation unit 20 can have bare metal wires (not shown) that extend into the earth, or the irrigation unit 20 can include a metallic bottom (not shown) that directly contacts the earth.

In alternative embodiments, the communication between the main control system 22 and the irrigation units 20 can be accomplished using RF signals through the air, infrared and/or other non-visible light signals, or using fiber optic cables, as non-exclusive examples. Furthermore, each irrigation unit 20 can retransmit a received signal to other irrigation units 20 in the irrigation system 10 to keep the signal strength high in the network. In one embodiment, while different irrigation units 20 receive and retransmit the signal, each irrigation unit 20 can have a unique identifier or serial number (ID). In this design, only the irrigation unit 20 having a predetermined ID will respond to the signal.

The main control system 22 monitors and controls the overall operation of the irrigation system 10 based on firmware algorithms stored in magnetic or optical disks, the Read Only Memory unit (ROM) 312, and/or stored in the unit control systems 240. Data and programming information stored at each unit control system 240 can also be stored in the main control system 22. The main control system 22 can troubleshoot problems in the irrigation system 10 and take faulty or otherwise problematic irrigation units 20 off the system until they can be repaired or replaced.

In one embodiment, the main control system 22 is additionally used to program or reprogram the irrigation units 20 with upgraded firmware, new irrigation sequences, and/or new irrigation requirements for changes in vegetation or reconfigured irrigation regions 30, as non-exclusive examples. Additionally, in one embodiment, the main control system 22 can control the sequence of the start times for each irrigation unit 20. Furthermore, the main control system 22 can be used to override the set irrigation duration, times, and control the irrigation units 20 to irrigate at other times.

In monitoring the operation of the irrigation system 10, the main control system 22 can obtain and store all data collected at and associated with each irrigation unit 20. The main control system 22 compares current and previously received data to provide statistical data and determine whether the irrigation system 10 and/or one or more of the irrigation units 20 are operating properly. For example, the main control system 22 collects data including the quantity of irrigation fluid used for each irrigation unit 20 over time, and the main control system 22 can compare the current usage for a given irrigation unit 20 to past usage amounts. If there is a significant change in usage amounts (e.g. above a threshold percentage) during a particular period in time, this could indicate that a problem exists at that irrigation unit 20 or in the irrigation line 32 leading toward or away from that irrigation unit 20.

For example, the main control system 22 can compare the irrigation fluid 19 usage for an irrigation unit 20 against the total system usage amount to determine if there is a potential problem in the irrigation line 32 (e.g. otherwise undetectable breaches in the irrigation line 32) and/or the irrigation unit 20. In other words, the main control system 22 can cooperate with the irrigation units 20 to determine if there are any "invisible" underground irrigation line breaks by comparing total irrigation unit 20 usage with the total irrigation fluid 19 initially delivered to one or more of the irrigation units 20.

For example, the irrigation system 10 can perform a static pressure test during non-irrigation times by obtaining a measurement of the irrigation fluid pressure near a fluid meter 330 positioned near a pump station (not shown) or fluid source 18 (illustrated in FIG. 1A), and comparing this measured pressure with the irrigation fluid pressure at the first pressure sensor 228A of one or more of the irrigation units 20. A disparity in pressure above a predetermined threshold percentage from near the fluid meter 330 to the irrigation unit 20 can indicate to the main control system 22 that a problem with a nearby irrigation line 32 exists, or it can be indicative of a problem with the irrigation unit 20 from which the decreased pressure was measured. This type of testing is enabled because of the ability of the irrigation system 10 to pressurize the irrigation lines without actually sending irrigation fluid 19 through the irrigation units 20.

Further, the irrigation system 10 can perform a dynamic pressure test by comparing the expected irrigation fluid pressure at one or more irrigation units 20 (taking into account elevation differences between the water source 18 and/or pump station 330 and the irrigation units 20) during an irrigation cycle, and comparing this expected pressure with the actual measured irrigation fluid pressure from the first pressure sensor 228A or the second pressure sensor 228B at the one or more irrigation units 20 during an irrigation cycle. If the expected pressure is a predetermined percentage above the measured pressure, this can be indicative of a breach in the irrigation line 32. By selectively activating certain irrigation units 20, the approximate location of the breached irrigation line can be determined. Any detected potential problem can be indicated on the display 318 of the main control system 22. With this design, a substantial amount of irrigation fluid can be saved as a result of detecting a leak when such leak could otherwise go undetected for an extended period of time.

Additionally, the main control system 22 can (i) collect all programming information for each irrigation unit 20, (ii) display all vegetation problems or failures reported by the irrigation units 20, (iii) poll all the irrigation units 20 to make certain they are there and functioning properly, (iv) reprogram any existing or replacement irrigation units 20 with the stored head programming data from the irrigation units 20, (v) reprogram any or all of the irrigation units 20 with new firmware, and/or (vi) reprogram the location(s) of the subregion(s) 34 in one or more irrigation regions 30, change from routine irrigating to new from seed irrigating, etc.

In another embodiment, the main control system 22 can control the sequence of start times for the individual irrigation units 20. Moreover, the manufacturer can be able to poll the main control system 22 and download all data with a modem. The data can be used by the manufacturer to enhance the algorithms and add new features.

Further, the main control system 22 can be utilized to determine if the irrigation units 20 are all operational, because the main control system 22 is in periodic and/or continuous communication with the irrigation units 20. For example, each irrigation unit 20 can be programmed to perform a self-test prior to irrigating its respective irrigation region 30. If there is a problem with the self-test, the unit control system 240 can communicate a fault to the main control system 22.

In one embodiment, the self-test can include determining whether the irrigation unit 20 is properly oriented relative to the alignment guides 38. Other self-testing functions can include taking humidity and/or temperature readings to determine proper functioning of one or more of the sensors, and checking proper functioning of the data storage device (RAM unit, ROM unit, EAROM), the power storage unit (battery or capacitor storage), the unit power source, communications, irrigation fluid pressure, etc. In one embodiment, the data from each irrigation unit 20 is compared with surrounding irrigation units 20 to determine whether a specific irrigation unit 20 is functioning consistently with other nearby irrigation units 20. For instance, in the event that one irrigation unit 20 is generating data indicating a greater than 5% disparity from one or more surrounding irrigation units 20, then main control system 22 can determine that a problem with the irrigation unit 20 may exist. This threshold percentage can vary depending upon the desired sensitivity of the system or the type of data being analyzed, and can be greater or less than 5%, i.e. 1%, 2%, 10%, 20%, 30%, 50%, 75%, 100%, or some other appropriate percentage.

The main control system 22 can attempt a repair of the irrigation unit 20 by sending a reset command to the unit control system 240, or by reprogramming the unit control system 240, after which the irrigation unit 20 can perform the self-test again. If no potential problem is indicated, then the irrigation unit 20 can proceed with the newly programmed irrigation plan. Alternatively, if there still is a potential problem, the main control system 22 can turn off the irrigation unit 20 and flag it for repair. In one embodiment, if an irrigation unit 20 needs to be replaced, the replacement irrigation unit 20 can be installed and programmed very efficiently since the information for each irrigation unit 20 is stored in the main control system 22.

Turning back to the control of the irrigation units 20, the irrigation unit 20 is controlled by one or more algorithms that are stored in and use information associated with each irrigation unit 20. The algorithms and initial information can be programmed into the unit control system 240 of the irrigation units 20 or can be downloaded from the main control system 22 or downloaded through the electrical interface 261. Initial information for each irrigation unit 20 can include (i) specific identification indicia, such as a serial number or ID, for the irrigation unit 20, (ii) topographical information, such as the slope and elevation of the region 30 and each subregion 34 within the irrigation region 30 for that irrigation unit 20, (iii) the type of grass or vegetation within each irrigation region 30 and subregion 34, and/or (iv) information defining the configuration or shape of the irrigation region 30 to be irrigated by the respective irrigation unit 20.

The algorithms can be utilized to control the irrigation sequences for each respective irrigation unit 20. After the irrigation sequences are determined for each irrigation unit 20, a priority for when the irrigation unit 20 is to perform its irrigation sequence is established and assigned to each irrigation unit 20.

In one embodiment, the algorithms and initial information for each irrigation unit 20 is programmed into the unit control system 240 for each irrigation unit 20 by an operator. In one embodiment, the initial information is inputted using a portable computing device 326 that is directly, wirelessly, inductively or capacitively coupled, or coupled using visible or invisible light, to the electronics of the unit control system 240 for one or more of the irrigation units 20 and/or the main control system 22. For example, the portable computing device 326 can be in communication with the electrical interface 261 of one or more of the irrigation units 20. In one embodiment, the portable computing device 326 is wirelessly connected to the irrigation unit 20 and/or the main control system 22 during programming of the irrigation units 20. With this connection, all of the irrigation units 20 in the system 10 can be programmed. Alternatively, in another embodiment, the algorithms and initial information can be input into the main control system 22 using the keyboard 318 or the portable computing device 326.

The portable computing device 326 can be electrically connected to the irrigation unit 20 via the electrical interface 261. In one embodiment, the portable computing device 326 includes a display screen that graphically displays with adjustable size the irrigation regions 30 and/or subregions 34 of the golf course 12. For example, the display screen can display one of the subregions 34 in detail. The position of the irrigation unit 20 in the irrigation subregion 34 and the serial number of the irrigation unit 20 can be input into the irrigation unit 20. Subsequently, the portable computing device 326 can control the unit control system 240 to use the subregion sensor 260 to locate the alignment guides 38 for the subregions 34. Once the irrigation unit 20 locates the alignment guides 38, the operator can control the irrigation unit 20 to irrigate the alignment guides 38. If necessary, the software of the irrigation unit 20 is adjusted so that the irrigation unit 20 accurately irrigates the alignment guides 38. This allows the irrigation unit 20 to accurately irrigate other areas of the subregion 34.

Additionally, with the subregion 34 displayed on the portable computing device 326, the operator can enter the features of each portion of the subregion 34. For example, the operator can enter the vegetation, trees, greens, fairways, cart path, water features, etc., of the specific subregion 34. In one embodiment, the irrigation unit 20 would be programmed not to irrigate the cart path. Another example would include programming the irrigation unit 20 to distribute more irrigation fluid 19 in a grass area than in a shrub area.

Once all of the subregions 34 in a specific irrigation region 30 have been programmed into the irrigation unit 20, the irrigation unit 20 can be programmed for which subregions 34 of the irrigation region 30 get irrigated first—and for how long—to prevent runoff. In one example, a first subregion 34 can require approximately 15 minutes of irrigating. However, runoff occurs after five minutes. In this example, the irrigation unit 20 would be programmed to irrigate the first subregion 34 for five minutes. After five minutes of irrigating, the irrigation unit 20 starts irrigating a second subregion 34. Subsequently, the irrigation unit 20 returns back to irrigate the first subregion 34 for another five minutes. This sequence is repeated until each subregion 34 is adequately irrigated. The sequencing would be continued until all of the subregions 34 have been programmed into the irrigation unit 20. Next, the priority of when each irrigation unit 20 starts would be entered by the operator. In one embodiment, the irrigation units 20 would go on by themselves at the start of the designated time if the irrigation unit 20 determined that there was sufficient pressure of the irrigation fluid 19 for the irrigation unit 20 to operate. In one embodiment, for a golf course 12, the irrigating start times and end times would be programmed in so as not to irrigate while golfers are in the vicinity, if possible.

Turning now to the automated operation of the irrigation system 10, as set forth above, different irrigating sequences can be carried out by one or more algorithms which are dependent on information specific to, and gathered by, each irrigation unit 20. The main control system 22 and unit control systems 240 of the irrigation system 10 of the present invention can use different types of algorithms to control the irrigating sequences performed by the individual irrigation units 20. In one embodiment, the type of algorithm employed in the irrigation system 10 can depend on real-time, changing parameters. Another embodiment utilizes a second type of algorithm that is set and does not change on its own. Instead, this type of algorithm may be changed, or reprogrammed, by the main control system 22, or manually by a system operator using the keyboard 316, the portable computing device 326 or another suitable method. In one embodiment, both the main control system 22 and the unit control systems 240 use the algorithms that depend on changing parameters. Alternatively, the unit control systems 240 can use the set algorithms, while the main control system 22 uses an algorithm that depends on changing parameters.

In general, the unit control systems 240 can utilize algorithms to determine an irrigation sequence for the subregions 34 within the irrigation region 30 of a corresponding irrigation unit 20. In contrast, the main control system 22 can control the overall operation, timing and sequence of the irrigation units 20 in an area of the golf course 12 (or other land area) such as a single golf hole 14, a portion of a golf hole 14, a portion of the golf course 12, or the entire golf course 12, as non-exclusive examples. Alternatively, the main control system 22 can also control the irrigation sequence for irrigation of the subregions 34 within one or more specific irrigation regions 30.

Referring first to the algorithms used by the unit control systems 240, in one embodiment, the unit control system 240 can be programmed to irrigate its respective irrigation region 30 in the following sequence: irrigate the subregions 34 with the highest elevations first, then irrigate the surrounding subregions 34 of these first-irrigated subregions 34, and then irrigate progressively lower elevation subregions 34. The algorithm used to perform the irrigation sequence could also take into consideration the slope of the subregions 34 in determining the quantity and/or flow rate of irrigation fluid 19 that is applied to the different subregions 34. For example, when irrigating the subregions 34 surrounding the highest elevations, the amount of irrigation fluid 19 used would be reduced by a predetermined percentage to compensate for an expected quantity of irrigation fluid 19 runoff from the higher elevation subregions 34. The percentage reduced can vary, and can be dependent upon the slope of the surrounding subregions 34, for example, such that the greater the slope, the greater the reduction of irrigation fluid 19 output for the surrounding, lower-lying subregions 34.

Other factors that the algorithm can take into account are, for example, the type of vegetation or grass in each subregion 34, or the fact that the subregion 34 contains a feature that does not require irrigation fluid 19, such as a cart path 16H, sand trap 16F, water feature 16G, or other features that do not require irrigation. Thus, the unit control system 240 can determine that the subregions 34 within a specific irrigation region 30 require a disparate amount of irrigation fluid 19, and that certain subregions 34 do not require any irrigation fluid 19. With this design, the irrigation unit 20 can precisely control the quantity and/or flow rate of irrigation fluid 19 applied to different and/or adjacent subregions 34.

For example, in alternative embodiments, the unit control system 240 can determine that approximately 5%, 10%, 25%, 50%, 75% or 100% greater irrigation fluid 19 is required as between different and/or adjacent subregions 34. Alternatively, some other percentage difference between different and/or adjacent subregions 34 may be determined by the unit control system 240.

The algorithm above is one of the set type of algorithms, since the sequence in which the subregions 34 are watered does not normally change. In an alternative embodiment the irrigating sequence could be based on an algorithm which depends on a real-time parameter such as the color of the grass or vegetation in each subregion 34. In this example, the algorithm can utilize sensor readings on the color in each subregion 34, and the irrigation sequence is carried out from lightest to darkest subregions 34, or from darkest to lightest. In still other embodiments, the above described algorithms can also take into account weather factors, such as, for example, the temperature, humidity, barometric pressure, wind direction and speed, in determining the amount of irrigation fluid 19 to use, once the sequence is determined.

Additionally, since the unit control systems 240 can obtain the various weather and vegetation readings in real-time, the algorithms can compare the current reading with past readings to determine whether any adjustments need to be made in the irrigating sequence and/or the amount of irrigation fluid 19 used. Stated another way, the algorithms can take into account a change in the physical condition of one or more subregions 34 within the irrigation region 30 over time.

For example, when the irrigation unit 20 is not irrigating, on a predetermined periodic basis, the date, time of day, temperature, amount of visible light, wind speed, humidity, temperature of specific vegetation, color of specific vegetation and/or other relevant parameters within the irrigation region 30 can be measured and stored by the irrigation unit 20. The algorithms stored in the unit control system 240 can use such past historical data along with current data (e.g. past 48 hours or some other suitable preset time period) in order to calculate the amount of irrigation fluid 19 required over time for each subregion 34 in the irrigation region 30.

Moreover, the unit control system 240 or the main control system 22 can compare the calculations from a particular irrigation unit 20 over time to detect discrepancies indicative of a problem with the irrigation unit or the vegetation within the irrigation region 30. For instance, if the calculated quantity of irrigation fluid 19 is being applied to a subregion 34, yet the color of the vegetation within the subregion is inconsistent with the desired color within a set period of time, the unit control system 240 can identify a problem. In one embodiment, the amount of irrigation fluid 19 can be steadily adjusted, i.e. increased or decreased over time, as determined by the algorithm(s) programmed into the unit control system 240, in order to achieve the desired color of vegetation. In the event the desired color is not achieved within a specified period of time as determined by the algorithm(s), the particular subregion 34 or irrigation unit 20 can be automatically or manually investigated for potential problems.

In this manner, the unit control systems 240 can be considered "smart systems," since they are continuously learning and adapting the irrigation sequence based on previous irrigation fluid 19 usage data including times, quantity, and irrigation regions 30, which is stored in the irrigation units 20. Further, since the unit control systems 240 are in communication with the main control system 22, the algorithms executed at the unit control systems 240 can request higher priority or additional irrigation fluid 19 from the main control unit 22 if the real-time measured conditions indicate that the algorithm calculations will not provide adequate irrigation for the irrigation region 30.

Moreover, in one embodiment, the unit control system 240 can reestablish an irrigation sequence anew for its respective irrigation unit 20 on a periodic basis. For example, the unit control system 240 can reevaluate and recalculate an appropriate irrigation sequence at least approximately once every 24 hours. In alternative embodiments, the unit control system 240 can determine an appropriate irrigation sequence more or less often than one every 24 hours.

In the above examples, the priority or sequence of when each irrigation unit 20 is operated can be programmed from the main control system 22 as determined by a system operator. For example, the irrigation units 20 can be grouped based on the type of region of the golf course 12, such as the fairways 16C, the greens 16E, and/or other areas. The different groups are assigned priority levels by the operator and programmed by the main control system 22 to the units 20. The main control system 22 would control the starting times for each group to begin its irrigation sequence. In one embodiment, the irrigating times would be times when the golf course 12 is not in use. At the programmed starting time, the irrigation units 20 in each group would start its programmed irrigating sequence if it is determined that there's sufficient pressure of irrigation fluid 19 to begin irrigation. However, these set times can be overridden if it is necessary to provide additional irrigation times due to extreme weather conditions, such as high temperatures, low humidity, etc. This can be done manually by a system operator, or alternatively, the unit control systems 240 can be programmed to run the algorithms whenever their sensors record information that the temperature or humidity on the golf course 12 has reached a specific threshold value. In this case, the unit control system 240 can communicate with the main control system 22, which can then decide whether or not the previously unscheduled irrigating should be performed.

In another embodiment, the algorithm for irrigating can be dependent upon the following parameters: temperature of the grass or vegetation, relative humidity, color of the grass or vegetation, amount of sunlight, time of day, time of year, irrigating requirements for the type of ground covering, wind conditions, or other suitable parameters. At preprogrammed times, the irrigation unit 20 can measure the temperature, amount of light, wind conditions and humidity at the unit 20, the temperature and/or color of the ground covering in the subregion 34. The unit control system 240 calculates an amount of irrigation fluid 19 necessary for the subregion 34 based on the temperature, amount of light, wind conditions and humidity at the irrigation unit 20, and an amount of irrigation fluid 19 based on the temperature and color of the grass.

In one embodiment, once the appropriate quantity of irrigation fluid 19 has been calculated for a subregion 34, only a certain percentage (for example, 10%, 20%, 30%, 40%, 50%, 60%, 70%, 80% or 90%) of the calculated quantity is applied over the subregion 34. The temperature and/or color of the grass is then checked and if an acceptable temperature and/or color are measured, irrigating is concluded (up to 100%) for that subregion 34. However, if the measured temperature and/or color are not acceptable, then an additional percentage (for example, another 10%, 20%, 30%, 40% or 50%) of the calculated fluid is applied over the subregion 34. The irrigation unit 20 continues to take the measurements and apply irrigation fluid 19 in this manner until acceptable measurements are obtained or until the irrigation quantity exceeds the calculated amount by a certain predetermined percentage. If the latter occurs, the unit control system 240 reports to the main control system 22 that there may be a problem at that subregion 34 or irrigation unit 20 serving that subregion 34.

In the above example, the algorithm includes a troubleshooting routine which tries to ensure that the proper amount of irrigation fluid 19 is being applied for the conditions and type of grass in the subregion 34. This is accomplished by repeatedly monitoring the temperature and color of the subregion 34 after applying irrigation fluid 19 to the subregion 34 and if the monitored temperature and/or color are not acceptable, more irrigation fluid 19 is applied. After some point however, when the temperature and/or color are still not within an acceptable range, the unit control system 240 communicates a problem to the main control system 22. The main control system 22 can then notify a system operator that there is a problem with the specifically numbered irrigation unit 20, and the irrigation unit 20 can be disabled until it can be manually trouble-shooted or otherwise repaired. Alternatively, the problem can be flagged for that irrigation unit 20 and it will continue watering at the previous rates adjusted in accordance with the measured sensor readings until maintenance corrects the problem.

Additionally, the unit control system 240 can use an algorithm that uses the same parameters, but which also takes into account previous readings of those parameters at past times/days/hours, in order to calculate the amount of irrigation fluid 19 that should be applied. By continuously using the information from previous irrigation sequences, the unit control system 240 is a "smart system" to provide more efficient and optimized irrigation to a given area.

Algorithms have been described herein as being executed by the unit control systems 240 and others by the main control system 22. One skilled in the art would recognize that the main control system 22 could perform all control algorithms. Similarly, the unit control systems 240 can perform the control algorithms carried out by the main control system 22, other than the overall sequencing algorithm.

While the particular embodiments of the automated irrigation system 10 and the irrigation units 20 as illustrated herein are fully capable of satisfying the needs and providing the advantages herein before stated, it is to be understood that it is merely illustrative of the presently preferred embodiments of the invention and that no limitations are intended to the details of construction or design herein shown other than as described in the appended claims.

What is claimed is:

1. An irrigation system for applying an irrigation fluid from a fluid source to an irrigation region, the irrigation system comprising:

a first alignment guide; and an irrigation unit spaced apart from the alignment guide, the irrigation unit directing the irrigation fluid to a portion of the irrigation region, the irrigation unit including (i) a nozzle that is in fluid communication with the fluid source so that the irrigation fluid from the fluid source is transferred to the nozzle, (ii) a sensor that senses the position of the first alignment guide relative to the nozzle, (iii) a unit control system that receives a signal from the sensor regarding the position of the first alignment guide relative to the nozzle to adjust one of a flow rate of irrigation fluid through the nozzle and a position of the nozzle, and (iv) a housing having a portion that is fixed relative to the irrigation region, the housing retaining the nozzle so that at least a portion of the nozzle is positioned within the housing.

2. The irrigation system of claim 1 wherein the sensor senses light waves.

3. The irrigation system of claim 1 wherein the unit control system adjusts a rotation of the nozzle about a first axis and a rotation of the nozzle about a second axis that is substantially perpendicular to the first axis based on the signal received from the sensor.

4. The irrigation system of claim 1 wherein the unit control system uses the signal received from the sensor to determine unwanted movement of the irrigation unit.

5. The irrigation system of claim 4 wherein a portion of the irrigation region has a surface, and wherein the unwanted movement of the irrigation unit includes movement about a first axis that is substantially parallel to the surface.

6. The irrigation system of claim 4 wherein a portion of the irrigation region has a surface, and wherein the unwanted movement of the irrigation unit includes movement about a second axis that is substantially orthogonal to the surface.

7. The irrigation system of claim 6 wherein the unwanted movement of the irrigation unit includes movement about a first axis that is substantially perpendicular to the second axis.

8. The irrigation system of claim 1 wherein the first alignment guide is formed from a plastic material.

9. The irrigation system of claim 1 wherein the first alignment guide is a portion of an existing feature.

10. The irrigation system of claim 1 wherein the unit control system adjusts both the flow rate of irrigation fluid through the nozzle and the position of the nozzle relative to the first alignment guide based on the signal received from the sensor.

11. The irrigation system of claim 1 wherein the irrigation unit includes an actuator that moves the sensor to locate the first alignment guide.

12. The irrigation system of claim 1 further comprising a spaced apart second alignment guide having a location that is sensed by the sensor.

13. The irrigation system of claim 12 wherein the irrigation unit is positioned substantially between the first and second alignment guides.

14. The irrigation system of claim 12 wherein the unit control system receives a signal from the sensor regarding the position of the second alignment guide to adjust one of a flow rate of irrigation fluid through the nozzle and the position of the nozzle relative to one of the alignment guides.

15. The irrigation system of claim 14 further comprising a third alignment guide that is sensed by the sensor, and wherein the unit control system receives a signal from the sensor regarding the position of the third alignment guide to adjust one of a flow rate of irrigation fluid through the nozzle and the position of the nozzle relative one of the alignment guides.

16. The irrigation system of claim 15 wherein the first, second and third alignment guides form a triangle having an interior, and wherein the irrigation unit is positioned substantially within the interior of the triangle.

17. The irrigation system of claim 15 wherein the irrigation region has a perimeter, and wherein at least one of the alignment guides is not positioned along the perimeter.

18. The irrigation system of claim 1 wherein the irrigation region has a perimeter, and wherein the first alignment guide is not positioned along the perimeter.

19. An irrigation system for applying an irrigation fluid from a fluid source to an irrigation region, the irrigation system comprising:

a first alignment guide that is fixed relative to the irrigation region; and an irrigation unit positioned within the irrigation region, a portion of the irrigation unit having a first orientation relative to the first alignment guide, the irrigation unit including (i) a nozzle that is in fluid communication with the fluid source so that the irrigation fluid from the fluid source is transferred to the nozzle, (ii) a sensor that senses the position of the first alignment guide relative to the portion of the irrigation unit, and (iii) a unit control system that receives a signal from the sensor to determine if the portion of the irrigation unit has moved from the first orientation.

20. The irrigation system of claim 19 wherein the unit control system adjusts a position of the nozzle based on the signal from the sensor.

21. The irrigation system of claim 19 wherein the unit control system adjusts a flow rate of irrigation fluid through the nozzle based on the signal from the sensor.

22. The irrigation system of claim 19 wherein the unit control system is programmed to control the flow rate of irrigation fluid though the nozzle and rotation of the nozzle about one or more axes based on the first orientation.

23. The irrigation system of claim 22 wherein the unit control system uses the signal from the sensor to recalibrate the irrigation unit following movement of the portion of the irrigation unit from the first orientation.

24. The irrigation system of claim 19 wherein the first alignment guide is formed from a plastic material.

25. The irrigation system of claim 19 wherein the first alignment guide is formed from a metallic material.

26. The irrigation system of claim 19 wherein the sensor is selected from the group consisting of an infrared sensor, a visible light sensor, an optical sensor and a pattern recognition sensor.

27. The irrigation system of claim 19 wherein the unit control system adjusts a flow rate of irrigation fluid through the nozzle, rotation of the nozzle about a first axis, and rotation of the nozzle about a second axis that is substantially perpendicular to the first axis based on the signal received from the sensor.

28. The irrigation system of claim 19 wherein the irrigation unit includes an actuator that moves the sensor to locate the first alignment guide.

29. The irrigation system of claim 19 wherein the unit control system uses the information from the sensor to determine movement of the irrigation unit from the first orientation to a second orientation that is different than the first orientation.

30. The irrigation system of claim 29 wherein a portion of the irrigation region has a surface, and the movement of the irrigation unit includes movement about a first axis that is substantially parallel to the surface.

31. The irrigation system of claim 29 wherein a portion of the irrigation region has a surface, and the movement of the irrigation unit includes movement about a second axis that is substantially orthogonal to the surface.

32. The irrigation system of claim 31 wherein the movement of the irrigation unit includes movement about a first axis that is substantially perpendicular to the second axis.

33. The irrigation system of claim 19 further comprising a second alignment guide that is sensed by the sensor.

34. The irrigation system of claim 33 wherein the irrigation unit is positioned substantially between the first and second alignment guides.

35. The irrigation system of claim 33 wherein the unit control system receives a signal from the sensor regarding the position of the second alignment guide to adjust one of a flow rate of irrigation fluid through the nozzle, rotation of the nozzle about a first axis, and rotation of the nozzle about a second axis that is substantially perpendicular to the first axis.

36. The irrigation system of claim 35 further comprising a third alignment guide that is sensed by the sensor, and wherein the unit control system receives a signal from the sensor regarding the position of the third alignment guide to adjust one of a flow rate of irrigation fluid through the nozzle, rotation of the nozzle about a first axis, and rotation of the nozzle about a second axis that is substantially perpendicular to the first axis.

37. The irrigation system of claim 36 wherein the first, second and third alignment guides form a triangle having an interior, and wherein the irrigation unit is positioned within the interior of the triangle.

38. The irrigation system of claim 36 wherein the irrigation region has a perimeter, and wherein the alignment guides are not positioned along the perimeter of the irrigation region.

39. A method for increasing irrigation accuracy of an irrigation unit that irrigates an irrigation region, the irrigation unit being susceptible to unintended movement, the method comprising the steps of:
    sensing a position of an alignment guide that is fixed relative to the irrigation region with a sensor that is coupled to a housing of an irrigation unit, the housing having a portion that is fixed relative to the irrigation region, the alignment guide being spaced apart from the irrigation unit;
    locating the alignment guide with the sensor following movement of a portion of the irrigation unit relative to the alignment guide; and
    adjusting one of a flow rate through a nozzle that is at least partially positioned within the housing of the irrigation unit and a position of the nozzle based on the relative position of the alignment guide following the movement of the portion of the irrigation unit.

40. The method of claim 39 wherein the step of adjusting includes adjusting both the flow rate through the nozzle and the position of the nozzle based on the position of the alignment guide following movement of the portion of the irrigation unit.

41. The method of claim 39 wherein the step of sensing includes sensing the position of three spaced apart alignment guides with the sensor.

42. The method of claim 39 further comprising the step of positioning one or more of the alignment guides within an irrigation region that is at least partially irrigated with the irrigation unit.

43. The method of claim 42 wherein the step of positioning includes forming a polygon with at least three alignment guides, and further comprising the step of positioning the at least three alignment guides so that the irrigation unit is positioned within an interior of the polygon.

44. The method of claim 42 wherein the step of positioning includes forming the alignment guides from a plastic material.

45. The method of claim 39 wherein the step of locating includes using an infrared sensor to sense the position of the alignment guide relative to a portion of the irrigation unit.

46. The method of claim 39 wherein the step of sensing includes using a sensor selected from the group consisting of an infrared sensor, a visible light sensor, an optical sensor and a pattern recognition sensor, to locate the alignment guide following movement of the portion of the irrigation unit.

47. The method of claim 39 wherein the step of adjusting includes transmitting a signal from the sensor to a unit control system positioned within the housing, and calculating an adjustment to one of the flow rate through the nozzle of the irrigation unit and the position of the nozzle with the unit control system based on the signal.

48. The method of claim 47 wherein the step of adjusting includes adjusting the rotation of the nozzle about a first axis and adjusting the rotation of the nozzle about a second axis that is substantially perpendicular to the first axis.

49. The method of claim 39 wherein the step of locating includes moving the sensor with an actuator.

50. An irrigation system for applying an irrigation fluid from a fluid source to an irrigation region having a perimeter, the irrigation system comprising:
    a plurality of alignment guides including a first alignment guide, a spaced apart second alignment guide, and a third alignment guide, wherein at least one of the alignment guides is not positioned along the perimeter of the irrigation region; and
    an irrigation unit that directs the irrigation fluid to a portion of the irrigation region, the irrigation unit being spaced apart from the first alignment guide, the irrigation unit including (i) a nozzle that is in fluid communication with the fluid source so that the irrigation fluid from the fluid source is transferred to the nozzle, (ii) a sensor that senses the position of the first alignment guide to determine an orientation of a portion of the irrigation unit, the sensor sensing the position of the second alignment guide, the sensor sensing the third alignment guide, and (iii) a unit control system that receives a signal from the sensor regarding the position of the portion of the irrigation unit and the second and third alignment guides to adjust one of a flow rate of irrigation fluid through the nozzle and a position of the nozzle relative to one of the alignment guides.

51. An irrigation system for applying an irrigation fluid from a fluid source to an irrigation region having a perimeter, the irrigation system comprising:
    a plurality of alignment guides including a first alignment guide, a second alignment guide and a third alignment guide, wherein the alignment guides are not positioned along the perimeter of the irrigation region; and
    an irrigation unit positioned within the irrigation region, a portion of the irrigation unit having a first orientation relative to the first alignment guide, the irrigation unit including (i) a nozzle that is in fluid communication with the fluid source so that the irrigation fluid from the fluid source is transferred to the nozzle, (ii) a sensor that senses the position of the first alignment guide relative to the portion of the irrigation unit, the sensor sensing the second and third alignment guides, and (iii) a unit control system that receives a signal from the sensor to determine if the portion of the irrigation unit has moved from the first orientation, the unit control system receiving a signal from the sensor regarding the position of the second and third alignment guides to adjust one of a flow rate of irrigation fluid through the nozzle, rotation of the nozzle about a first axis and rotation of the nozzle about a second axis that is substantially perpendicular to the first axis.

52. An irrigation system for applying an irrigation fluid from a fluid source to an irrigation region, the irrigation system comprising:
an irrigation unit that directs the irrigation fluid to a portion of the irrigation region, the irrigation unit including (i) a nozzle that is in fluid communication with the fluid source so that the irrigation fluid from the fluid source is transferred to the nozzle, (ii) a sensor that determines an orientation of a portion of the irrigation unit, and (iii) a unit control system that receives a signal from the sensor regarding the position of the portion of the irrigation unit to adjust (a) one of a flow rate of irrigation fluid through the nozzle and a position of the nozzle, and (b) rotation of the nozzle about a first axis and rotation of the nozzle about a second axis that is substantially perpendicular to the first axis.

53. An irrigation system for applying an irrigation fluid from a fluid source to an irrigation region, the irrigation system comprising:
a first alignment guide; and
an irrigation unit positioned within the irrigation region, the first alignment guide being positioned remotely from the irrigation unit, a portion of the irrigation unit having a first orientation relative to the first alignment guide, the irrigation unit including (i) a nozzle that is in fluid communication with the fluid source so that the irrigation fluid from the fluid source is transferred to the nozzle, (ii) a sensor that senses the position of the first alignment guide relative to the portion of the irrigation unit, the sensor being selected from the group consisting of an infrared sensor, a visible light sensor, an optical sensor and a pattern recognition sensor, and (iii) a unit control system that receives a signal from the sensor to determine if the portion of the irrigation unit has moved from the first orientation.

54. The irrigation system of claim 1 wherein the unit control system adjusts the nozzle about an axis that is substantially parallel to the irrigation region based on the signal.

55. The irrigation system of claim 19 wherein the unit control system adjusts the nozzle about an axis that is substantially parallel to the irrigation region based on the signal.

56. The method of claim 39 wherein the step of adjusting includes adjusting the position of the nozzle by moving the nozzle about an axis that is substantially parallel to the irrigation region.

\* \* \* \* \*

UNITED STATES PATENT AND TRADEMARK OFFICE
CERTIFICATE OF CORRECTION

PATENT NO.       : 7,617,992 B2                                                                 Page 1 of 1
APPLICATION NO.  : 10/977916
DATED            : November 17, 2009
INVENTOR(S)      : Norman Ivans It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Nineteenth Day of October, 2010

David J. Kappos
*Director of the United States Patent and Trademark Office*